United States Patent
Eisenberg

(12) 
(10) Patent No.: US 11,553,813 B2
(45) Date of Patent: Jan. 17, 2023

(54) INFUSION ASSEMBLY, CONTAINMENT VESSEL PROVIDED WITH SUCH AN INFUSION ASSEMBLY, KIT FOR ASSEMBLING THE SAME, AND CORRESPONDING METHODS OF MANUFACTURING, OPERATING AND USE ASSOCIATED THERETO

(71) Applicant: MENNA CORPORATION, Montréal (CA)

(72) Inventor: Orit Eisenberg, Montréal (CA)

(73) Assignee: MENNA CORPORATION, Montréal (CA)

( * ) Notice: Subject to any disclaimer, the term of this patent is extended or adjusted under 35 U.S.C. 154(b) by 181 days.

(21) Appl. No.: 16/494,854

(22) PCT Filed: Mar. 19, 2018

(86) PCT No.: PCT/CA2018/050330
§ 371 (c)(1),
(2) Date: Sep. 17, 2019

(87) PCT Pub. No.: WO2018/165771
PCT Pub. Date: Sep. 20, 2018

(65) Prior Publication Data
US 2020/0008605 A1 Jan. 9, 2020

Related U.S. Application Data
(60) Provisional application No. 62/472,965, filed on Mar. 17, 2017.

(51) Int. Cl.
*A47J 31/00* (2006.01)
*A45F 3/18* (2006.01)
(Continued)

(52) U.S. Cl.
CPC ............ *A47J 31/005* (2013.01); *A45F 3/18* (2013.01); *A47J 31/0626* (2013.01);
(Continued)

(58) Field of Classification Search
CPC ...... A47J 31/005; A47J 31/0626; A47J 31/18; A47J 31/20; A47J 43/046
(Continued)

(56) References Cited

U.S. PATENT DOCUMENTS 3,657,994 A * 4/1972 Post .................. A47J 31/20
99/323
4,108,053 A 8/1978 Vink
(Continued)

FOREIGN PATENT DOCUMENTS

CN 203458139 U 3/2014
CN 105231761 A 1/2016
(Continued)

OTHER PUBLICATIONS

Tea Trends "Ellora Perfect Tea Travel Mug" online at https://www.amazon.com/Ellora-Perfect-Tea-Travel-Mug/dp/B00KK3LR5Y?th=1 Publication date unknown.
(Continued)

*Primary Examiner* — Reginald Alexander

(57) ABSTRACT

A containment vessel (1) with integrated infusion capability for infusing a solid substance with a liquid. The containment vessel (1) includes a main containment body (3), a dispensing assembly (5), an infusion assembly (9), a transmission assembly (15), and an actuating assembly (17), the actuating assembly (17) being operatively connectable to the transmission assembly (15) for displacing one of inner and outer infusion components (11,13) with respect to the other via the transmission assembly (15), so as to in turn selectively operate the infusion assembly (9) between active and inac-
(Continued)

tive modes, the actuating assembly (17) being manually operated and having at least one actuating component (17a), such an actuating ring (27), for example, being provided about a peripheral surface of the containment vessel (1).

20 Claims, 21 Drawing Sheets

(51) Int. Cl.
*A47J 31/06* (2006.01)
*A47J 31/44* (2006.01)
*A47J 31/20* (2006.01)

(52) U.S. Cl.
CPC .......... *A47J 31/0652* (2013.01); *A47J 31/20* (2013.01); *A47J 31/4403* (2013.01)

(58) Field of Classification Search
USPC .................................................. 99/322, 323
See application file for complete search history.

(56) References Cited

U.S. PATENT DOCUMENTS

| | | | |
|---|---|---|---|
| 4,627,334 A | 12/1986 | Shanklin | |
| 5,809,868 A * | 9/1998 | Milone | B65D 85/8085 99/279 |
| 5,947,004 A | 9/1999 | Huang | |
| 5,984,141 A | 11/1999 | Gibler | |
| 6,318,244 B1 | 11/2001 | Justus | |
| 7,213,507 B2 | 5/2007 | Glucksman et al. | |
| 7,958,816 B2 | 6/2011 | Lin | |
| 8,234,971 B2 | 8/2012 | Cerroni | |
| 8,985,377 B2 | 3/2015 | Lane | |
| 9,254,950 B2 | 2/2016 | Justus et al. | |
| 9,314,126 B2 | 4/2016 | Molayem | |
| 9,713,399 B2 * | 7/2017 | Boone | A47J 31/521 |
| 9,743,797 B2 | 8/2017 | Richardson | |
| 2010/0224078 A1 | 9/2010 | Khalifa | |
| 2010/0263549 A1 | 10/2010 | Lee | |
| 2013/0118358 A1 | 5/2013 | Lown | |
| 2013/0239821 A1 | 9/2013 | Boettcher | |
| 2017/0303725 A1 | 10/2017 | Buchbinder | |
| 2018/0242775 A1 * | 8/2018 | Lin | A47J 31/0636 |

FOREIGN PATENT DOCUMENTS

| | | |
|---|---|---|
| CN | 105249667 A | 1/2016 |
| CN | 106175356 A | 12/2016 |
| WO | 2017041489 A1 | 3/2017 |

OTHER PUBLICATIONS

Canadian Intellectual Property Office; International Search Report for International Application No. PCT/CA2018/050330; Completed May 30, 2018; Gatineau, Quebec K1A 0C9, Canada.

Canadian Intellectual Property Office; International Preliminary Report on Patentability for International Application No. PCT/CA2018/050330; Completed Jun. 18, 2019; Gatineau, Quebec K1A 0C9, Canada.

Canadian Intellectual Property Office; Written Opinion of the International Searching Authority for International Application No. PCT/CA2018/050330; dated Jun. 8, 2018; Gatineau, Quebec K1A 0C9, Canada.

* cited by examiner

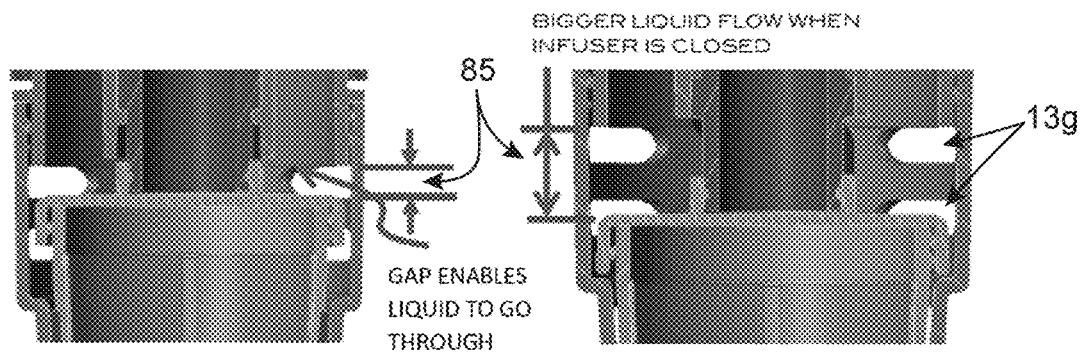
OPEN INFUSER POSITION
FIG. 49
CLOSED INFUSER POSITION
FIG. 50
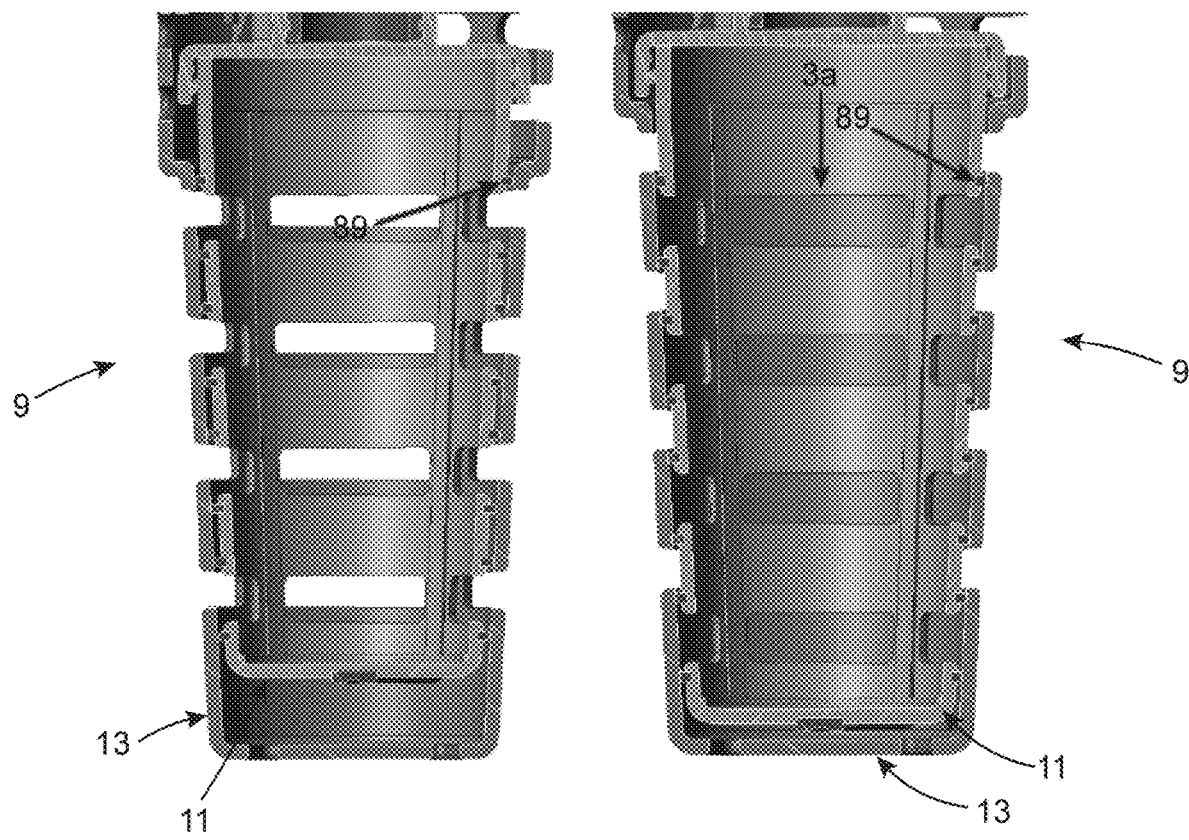
OPEN POSITION
FIG. 51
CLOSED POSITION
FIG. 52

INFUSION ASSEMBLY, CONTAINMENT VESSEL PROVIDED WITH SUCH AN INFUSION ASSEMBLY, KIT FOR ASSEMBLING THE SAME, AND CORRESPONDING METHODS OF MANUFACTURING, OPERATING AND USE ASSOCIATED THERETO

FIELD OF THE INVENTION

The present invention relates to an infusion assembly (hereinafter referred to also as "infusion system"), for infusing substantially solid substances, such as tea and the like. More particularly, the present invention relates to a new and improved infusion system for use with various types of containment vessels, such as mugs, kettles and the like, and also relates to a containment vessel provided with such an infusion system, as well as to a kit for assembling the same (ex. infusion system, corresponding containment vessel, associated accessory(ies), etc.), and to corresponding methods of manufacturing, operating and/or use associated thereto. The present application claims the priority of U.S. provisional patent application No. 62/472,965 dated Mar. 17, 2017, the content of which is incorporated herein by reference.

BACKGROUND OF THE INVENTION

It is well known in the art that tea typically takes about three (3) to about five (5) minutes to steep. Many teas can be steeped multiple times. According to the type of tea, time to "optional" and/or "desired" level of infusion will vary. If the tea leaves are left to infuse longer, the drink might become too "bitter" for some consumers.

Portable vessels, such as mugs, cups and the like, are convenient to infuse and drink a hot beverage while travelling in the car, in the bus, at the office, etc., but the infusion process has to be stopped after a certain amount of time. Current devices configured for infusing and drink tea typically comprise a steep basket that needs to be taken out of the cup so that the taste of the beverage is "optimal", and does not become too "bitter", etc. Oftentimes, one has to find a sink or a garbage bin to empty and rinse the steep basket, which is not convenient when "on-the-go" (ex. when out of the house, when travelling on foot, in the car, etc., and/or when doing certain activities, like going to the gym, etc.). A user will typically finish drink his/her beverage, and if he/she wants to have another one, the basket needs to be filled up again and put back into the steep basket, which may "contaminate" the subsequent infusion process and/or corresponding resulting beverage.

It is also known that tea infusion time varies according to personal preferences, so the possibility to infuse the leaves, taste it, and adjust it, according to one's own personal preferences, is very appealing. There are different infusion devices that enable some degree of adjustability in terms of duration and/or level of infusion.

For example, some existing products push the tea leaves downwardly to "stop", or at the very least, considerably "reduce" the infusion process. This method is similar to the one used with devices intended to prepare coffee, but it is not typically how tea should be infused.

Other devices comprise a bottle/vessel containing a basket to load tea. The basket is permeable to liquid and steeping continues until the user completely removes/takes the basket out of the vessel.

Known to the Applicant is the travel press from Bodum™, which is similar to a French Press for coffee infusion. It steeps the tea using a type of plunger. Once the plunger is at the bottom, the tea partially stops steeping. However, there is still water in contact with the tea leaves coming in through the sieve of the stainless steel tea press, and there are sediments at the bottom, which is undesirable for obvious reasons. Other potential drawbacks reside in that tea continues to steep when pressed, and one cannot drink directly from this infuser device, or at the very least, not conveniently.

Also known to the Applicant is a tea control teapot with a brew/stop infuser. It works through a turning mechanism, but it does not lock securely in place, in that, it does not 100% seal water from steeping tea leaves. If shaken, the tea infuser will move which results in tea continuing to steep. It is generally made of plastic only, and does not include a stainless steel mesh, so it does not work properly to infuse fine tea leaves such as rooibos, for example.

Also known to the Applicant is the Aladdin™ custom tea infuser mug which comprises a basket to contain loose tea leaves, tea bags or coarse ground coffee—the basket is then dropped down into the double walled mug to steep and when the user is satisfied with the brew, the basket is pulled up by pulling on a tab. However, if the mug is upside down while the user is "on-the-go", the infusion will continue, resulting in a bitter taste, which is undesirable, for obvious reasons, etc.

Known to the Applicant(s) are the following documents:

For example, U.S. Pat. No. 6,318,244 B1 granted on Nov. 20, 2001, to JUSTUS relates to a "device for encasing flavoring solids". This document describes a device for encasing flavoring solids, in particular tea material or coffee, that are put into a liquid, in particular water, with a vane movable between an initial and a final position, which vane in its final position bounds a space that holds the flavoring solids, the vane being designed as a rotatable vane that is supported so as to be rotatable around a rotational axis.

U.S. Pat. No. 7,213,507 B2 granted on May 8, 2007, to GLUCKSMAN et al., relates to an "infusion beverage brewing system". This document describes an infusion beverage brewing system including a container and an infuser. The infuser is positioned in a liquid, such as hot water, and has an infusing chamber for containing infusible materials, such as tea leaves. A plunger includes a piston with a peripheral seal and flap valves. After a brewing time has elapsed, an individual pushes on an operator to move the piston past a perforated wall portion of the infusing chamber. When the piston reaches a solid wall portion at the bottom of the infusing chamber, the flap valves open to allow liquid to escape. However, small apertures aligned with the flap valves prevent the passage of the infusible material. Consequently, the infusible material is isolated from the liquid when the piston reaches a solid bottom wall portion of the infusing chamber.

U.S. Pat. No. 9,254,950 B2 granted on Feb. 9, 2016, to JUSTUS et al., relates to a "device for encapsulating flavoring solids and container having such a device". This document describes a device into encapsulate solid flavoring substances, particularly tea or coffee, added to a liquid, particularly water, with a wing-shaped rotary slider supported rotational about a rotary axis between an initial position and an end position, which in its end position limits a space accepting the solid flavoring substances, with the device being embodied for the installation in a container with its top showing an opening to fill in or discharge the liquid, which can be closed by a lid, which for closing and opening the container opening is subjected to a rotary motion, characterized in that the rotary slider comprises at least one engagement means by which the rotary slider can be made to engage the lid at least during the rotary motion in order to close the container opening and can be rotated into its end position.

Also known to the Applicant are the following US documents: U.S. Pat. Nos. 4,108,053; 4,627,334; 5,947,004; 5,984,141; 7,958,816 B2; 8,234,971 B2; 8,985,377 B2; 9,314,126 B2; 9,713,399 B2; 9,743,797 B2; 2010/0224078 A1; 2010/0263549 A1; 2012/0225176 A1; 2013/0118358 A1; 2013/0239821 A1; and 2017/0303725 A1;

As known to the Applicant are the following documents: CN 105249667 B; CN 105231761 A; CN 106175356 A; CN 203458139 U; and WO 2017/041489 A1.

The Applicant is also aware of the following product: "Ellora Perfect Tea Travel Mug" (see for example: https://www.youtube.com/watch?v=3nOxyNePMgM).

Despite these known improvements, there is a need to continue innovating and finding better and/or different ways of infusing substances, such as tea and the like, in a more efficient, more precise, more accurate, more reliable, more adjustable, more versatile, more adaptable, more controlled, more timely, and/or more desirable manner.

Thus, it would be particularly useful to be able to provide an improved infusion system which, by virtue of its design and components, would be able to overcome or at least minimize some of these known drawbacks associated with conventional infusion devices.

SUMMARY OF THE INVENTION

An object of the present invention is to provide a new infusion system which, by virtue of its design and components, is intended to satisfy the above-mentioned need and which is thus an improvement over other related infusion devices, systems, assemblies and/or methods known in the prior art.

In accordance with the present invention, the above main can be achieved, as will be easily understood, with an infusion system (and/or a corresponding containment vessel and/or associated accessory provided with at least one such infusion system, as well as corresponding kits for assembling the same (ex. infusion system, containment vessel, accessory, etc.), and corresponding methods of manufacturing, assembling, operating, use, etc.) such as the one(s) briefly described herein and/or such as the one exemplified in the accompanying drawings.

More particularly, according to one aspect of the present invention, there is provided there is provided an infusion system for infusing a solid substance with a liquid of a containment vessel, the infusion system comprising:

inner and outer infusion components intended to be inserted into the containment vessel for cooperation with the liquid, one of the infusion components being operatively mountable onto the containment vessel, with the inner component being positioned, shaped and sized for containing the solid substance to be steeped into the liquid of the containment vessel, the infusion components being each provided with at least one hole, and one of the infusion components being moveable with respect to one another, so as to allow the infusion system be operable between an active mode, where a hole of the outer infusion component is aligned with a corresponding hole of the inner infusion component in order to define a fluid passage where infusion of the solid substance takes place with the liquid present in the containment vessel, and an inactive mode, where the hole of the outer infusion component is misaligned with the corresponding hole of the inner infusion component in order to selectively close the fluid passage and thus selectively stop an infusion process of the solid substance with the liquid present inside the containment vessel As will be explained in greater detail hereinbelow, the present system is particularly advantageous in that, due to its components and features, the infusion system is capable of allowing a user to selectively adjust infusion "time", for a better resulting taste (i.e. according to one's own personal preferences, and/or other considerations, etc.), and also allows to conveniently repeat multiple infusions, without the drawbacks (ex. possible contamination, etc.) associated with known conventional devices.

According to another aspect of the present invention, there is provided a corresponding containment vessel (ex. mug, cup, kettle, pot, etc.) and/or an associated accessory provided with at least one of the above-mentioned infusion system.

Indeed, according to another possible aspect of the present invention, it is also an object to provide a containment vessel with integrated infusion capability for infusing a solid substance with a liquid, the containment vessel comprising:

a main containment body having a containment volume for containing the liquid;

a dispensing assembly being removably mountable onto the main containment body, and having at least one fluid port being fluidly connectable to the containment volume of the main containment body, for dispensing fluid through said at least one fluid port;

an infusion assembly operatively mountable between the main containment body and the dispensing assembly, the infusion assembly having inner and outer infusion components insertable into the containment volume of the containment body for cooperation with the liquid, a first one of the infusion components being operatively mountable onto the main containment body, with the inner component being positioned, shaped and sized for containing the solid substance to be steeped into the liquid of the main containment body, the infusion components being each provided with at least one hole, and a second one of the infusion components being moveable with respect to the first one, so as to allow the infusion assembly to be operable between an active mode, where at least one operative hole of the outer infusion component is aligned with at least one corresponding operative hole of the inner infusion component in order to define a fluid passage where infusion of the solid substance takes place with the liquid present in the main containment body, and an inactive mode, where the at least one operative hole of the outer infusion component is misaligned with the at least one corresponding operative hole of the inner infusion component in order to selectively close the fluid passage and thus selectively stop an infusion process of the solid substance with the liquid present inside the main containment body;

a transmission assembly operatively connectable to the infusion assembly for mechanically driving the infusion assembly between the active and inactive modes; and an actuating assembly operatively connectable to the transmission assembly for displacing one of the inner and outer infusion components with respect to the other via the transmission assembly, so as to in turn selectively operate the infusion assembly between the active and inactive modes, the actuating assembly being manually operated and having at least one actuating component being provided about a peripheral surface of the containment vessel.

According to another aspect of the present invention, there is provided a method of manufacturing (ex. making, assembling, etc.) the above-mentioned infusion system, containment vessel and/or associated accessory.

According to another aspect of the present invention, there is provided a method of operating and/or using the above-mentioned infusion system, containment vessel and/or associated accessory.

According to another aspect of the present invention, there is provided an assembly, a system, a station and/or a machine for carrying out the above-mentioned method(s).

According to another aspect of the present invention, there is provided a processing plant provided with any one and/or at least one of the above-mentioned assembly, system, station, machine and/or components thereof.

According to another aspect of the present invention, there is provided a method of manufacturing (ex. producing, assembling, etc.) the above-mentioned infusion system, containment vessel, accessory, assembly, system, station, machine, processing plant and/or components thereof.

According to another aspect of the present invention, there is provided a method of operating the above-mentioned assembly, system, station, machine, processing plant and/or components thereof.

According to another aspect of the present invention, there is provided a kit with corresponding components for assembling the above-mentioned infusion system, containment vessel, associated accessory and/or components thereof.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned infusion system, containment vessel, associated accessory, method(s), kit, set, assembly, system, station, machine, processing plant and/or components thereof.

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIGS. 23-52 are different views of various aspects, components and/or features of a containment vessel provided with an integrated infusion assembly according to possible embodiments of the present invention.

DETAILED DESCRIPTION OF PREFERRED EMBODIMENTS OF THE INVENTION

Figure 2:
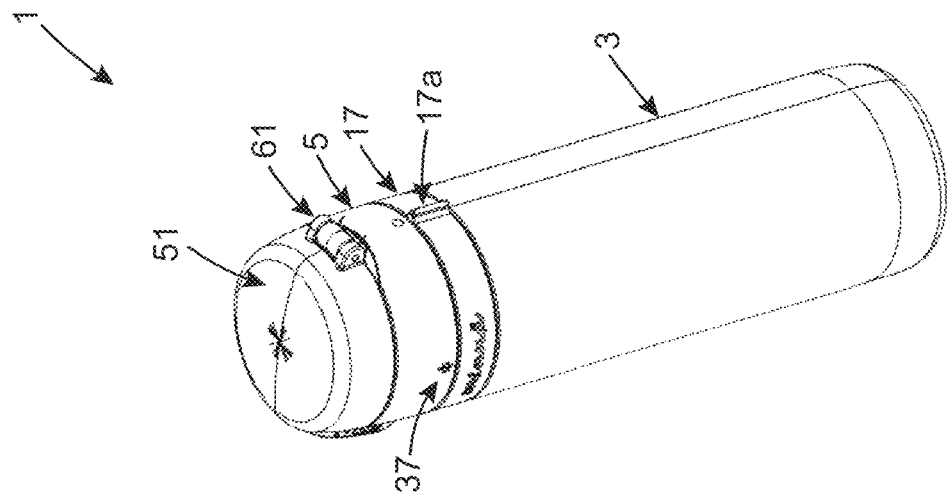
FIG. 2 is a top perspective view of a rear portion of what is shown in FIG. 1.
Figure 1:
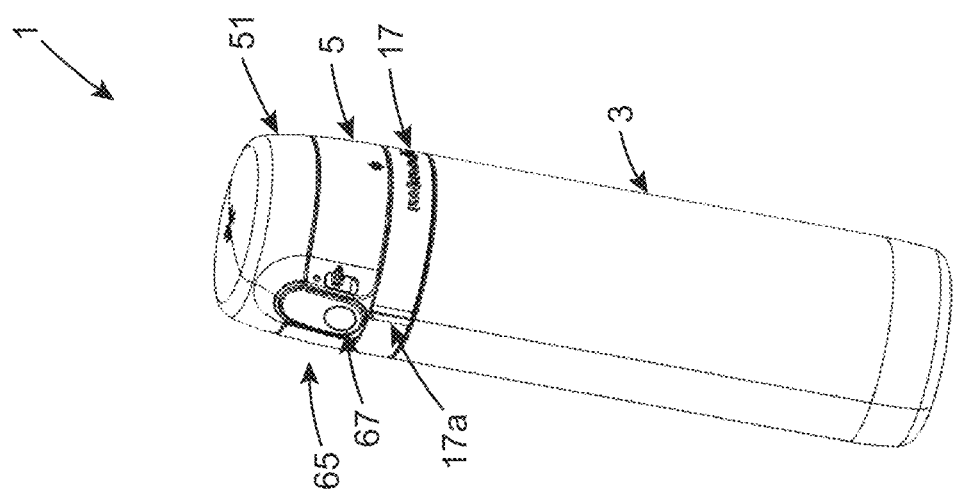
FIG. 1 is a top perspective of a front portion of containment vessel provided with an integrated infusion assembly according to a possible embodiment of the present invention.
Figure 3:
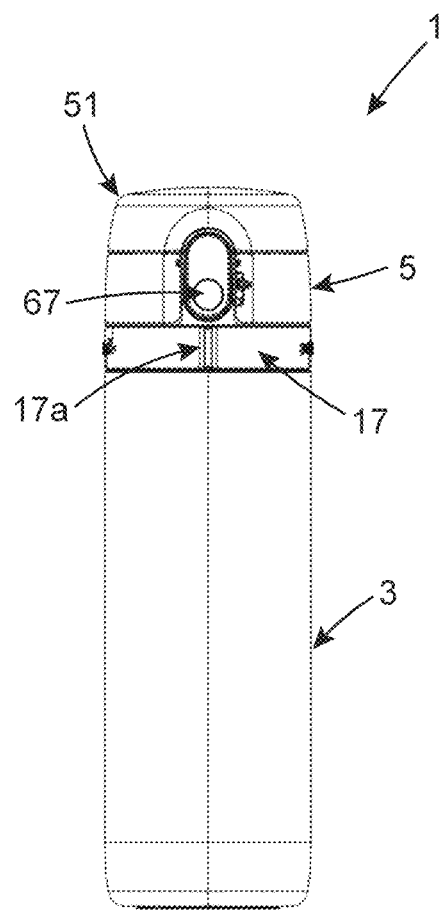
FIG. 3 is a front elevational view of what is shown in FIG. 1.
Figure 4:
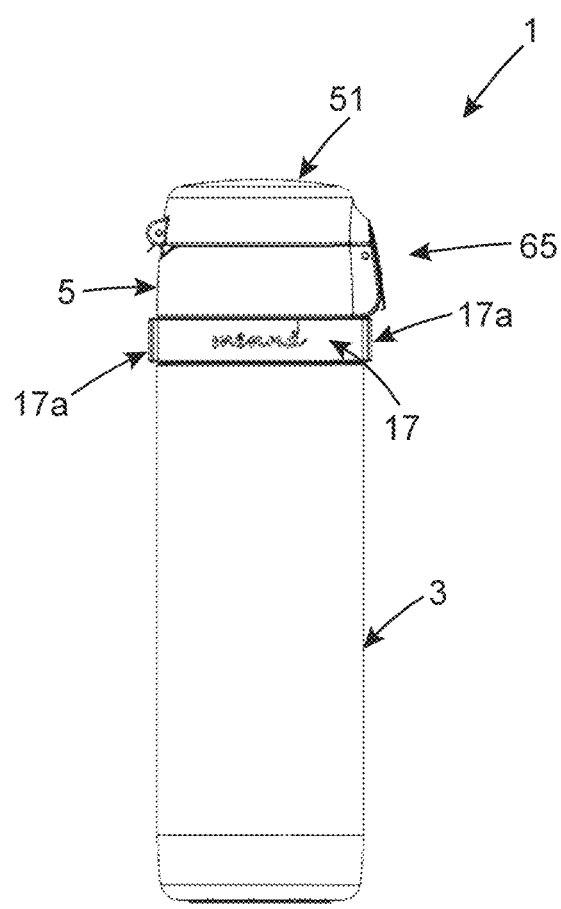
FIG. 4 is a right-side elevational view of what is shown in FIG. 3.
Figure 5:
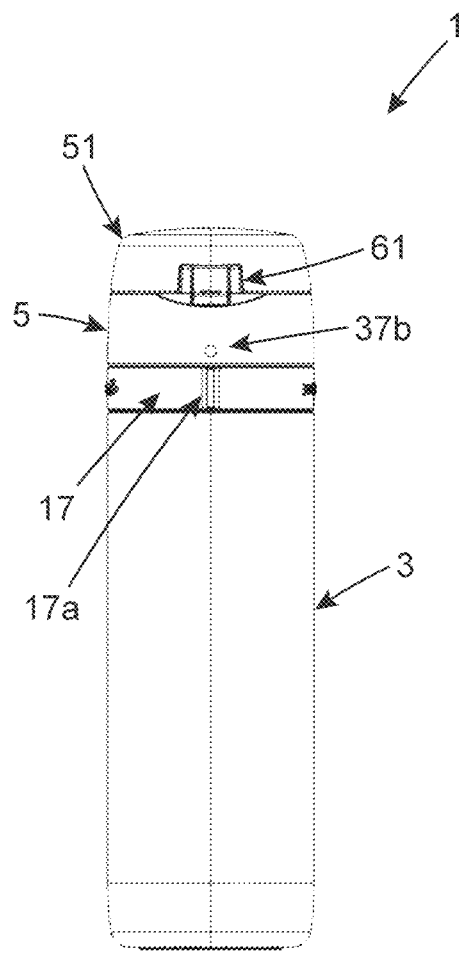
FIG. 5 is a rear elevational view of what is shown in FIG. 3.
Figure 6:
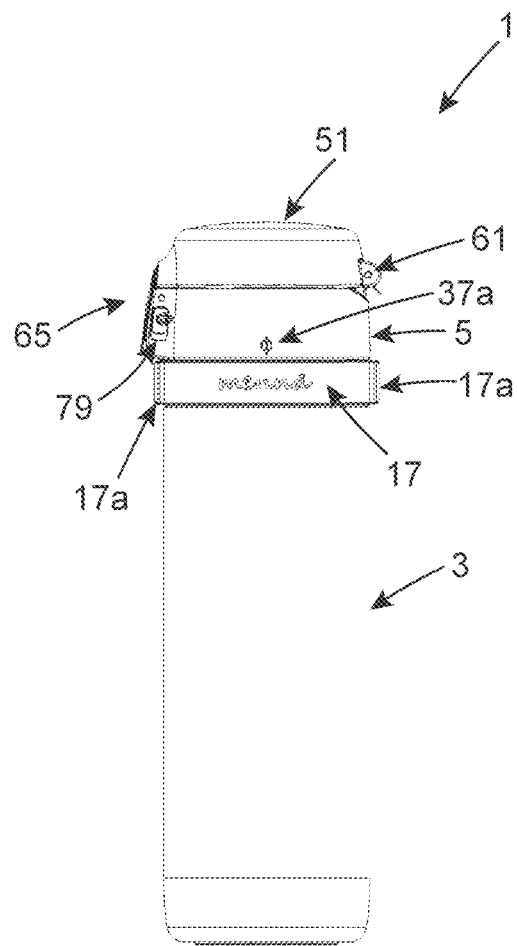
FIG. 6 is a left-side elevational view of what is shown in FIG. 3.
Figure 7:
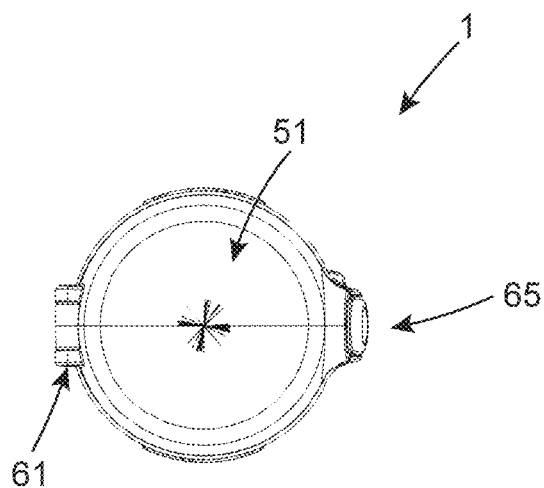
FIG. 7 is a top plan view of what is shown in FIG. 3.
Figure 8:
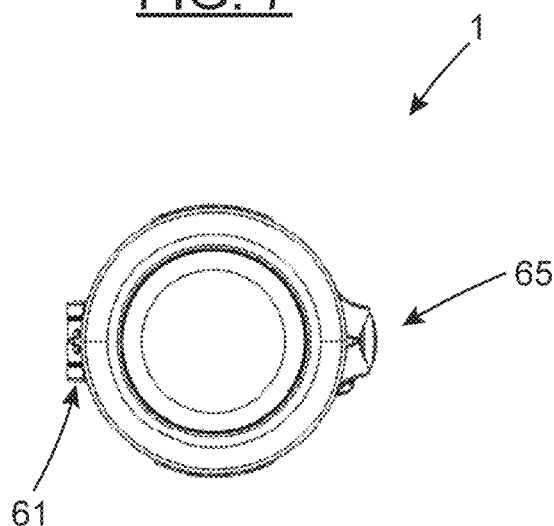
FIG. 8 is a bottom plan view of what is shown in FIG. 3.
Figure 10:
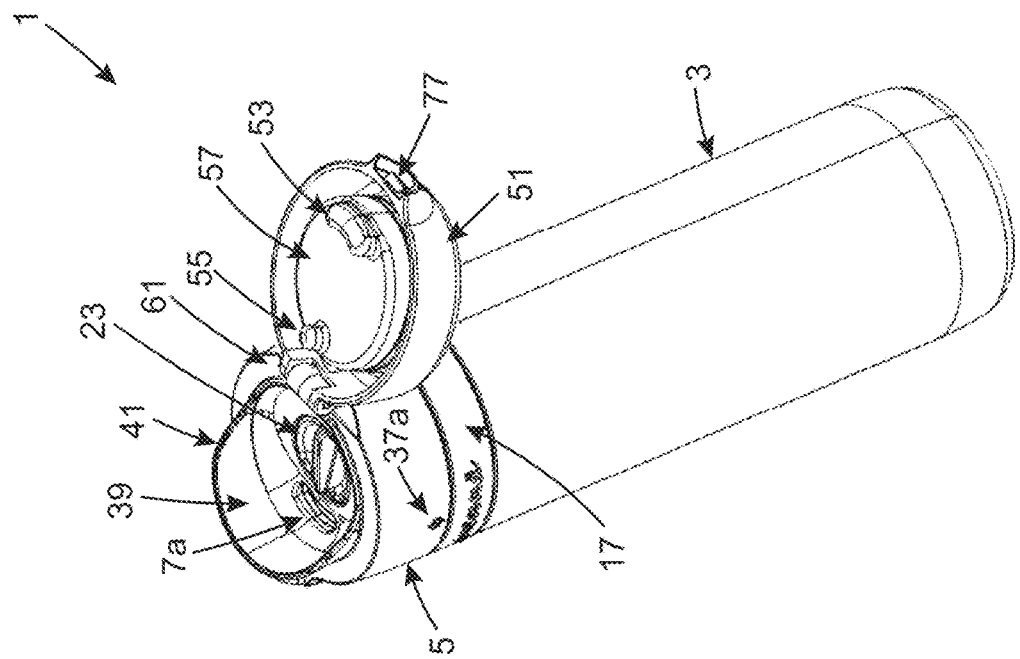
FIG. 10 is a top perspective view of a rear portion of what is shown in FIG. 9.
Figure 9:
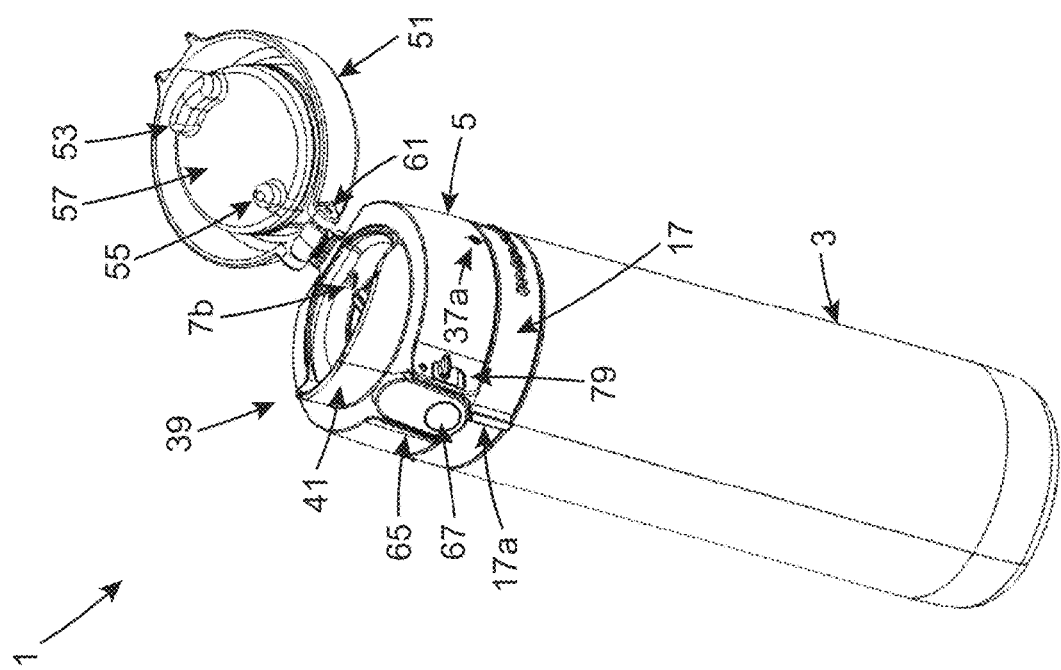
FIG. 9 is another top perspective of a of what is shown in FIG. 1, the containment vessel being now shown with its cap component in an opened configuration.
Figure 11:
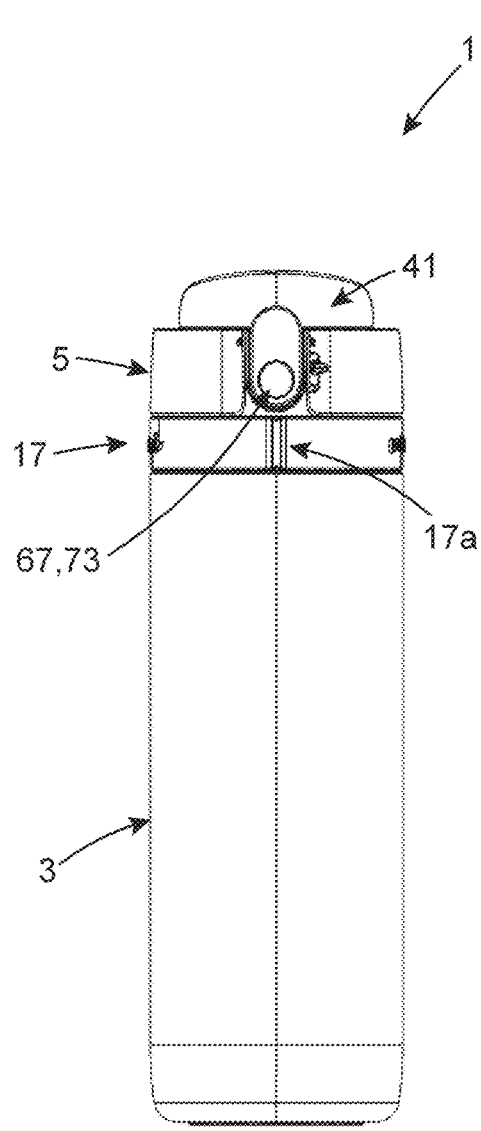
FIG. 11 is a front elevational view of what is shown in FIG. 9.
Figure 12:
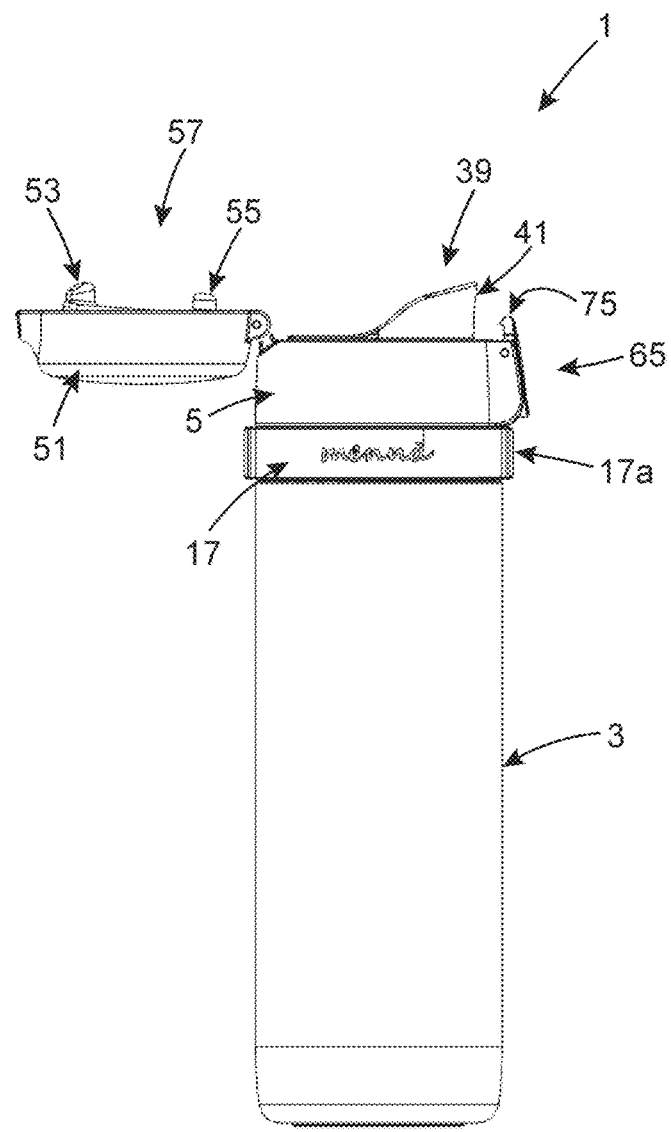
FIG. 12 is a right-side elevational view of what is shown in FIG. 11.
Figure 13:
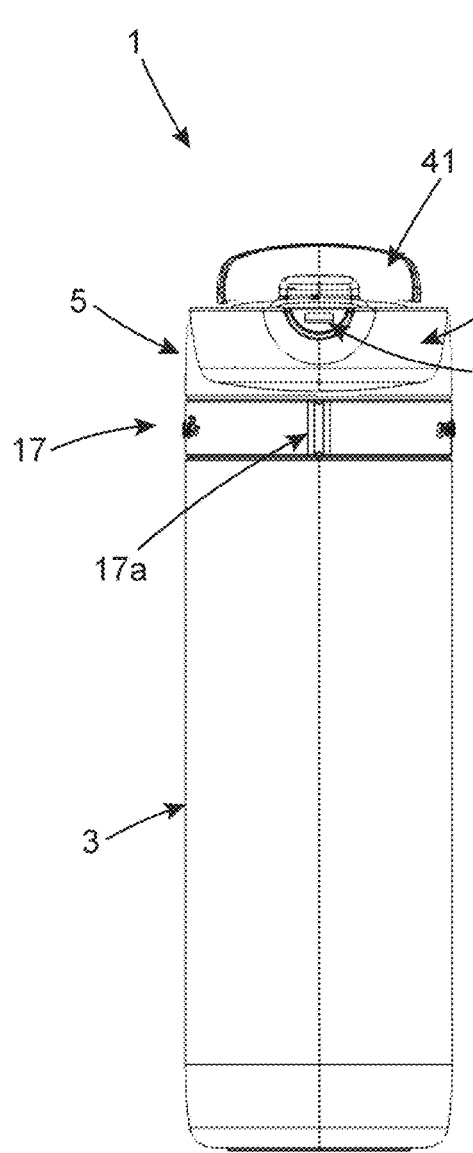
FIG. 13 is a rear elevational view of what is shown in FIG. 11.
Figure 14:
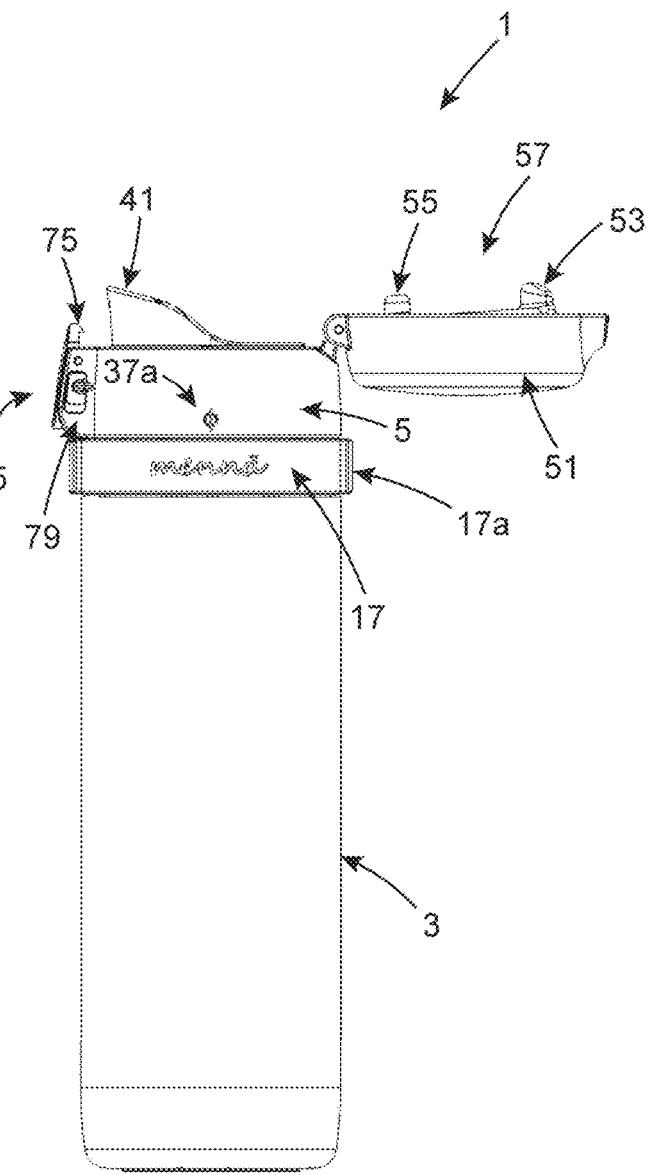
FIG. 14 is a left-side elevational view of what is shown in FIG. 11.
Figure 15:
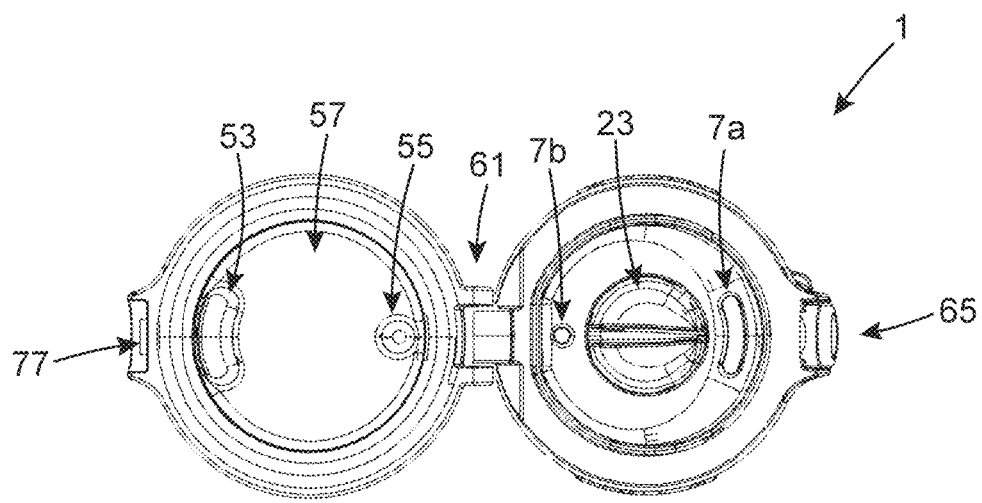
FIG. 15 is a top plan view of what is shown in FIG. 11.
Figure 16:
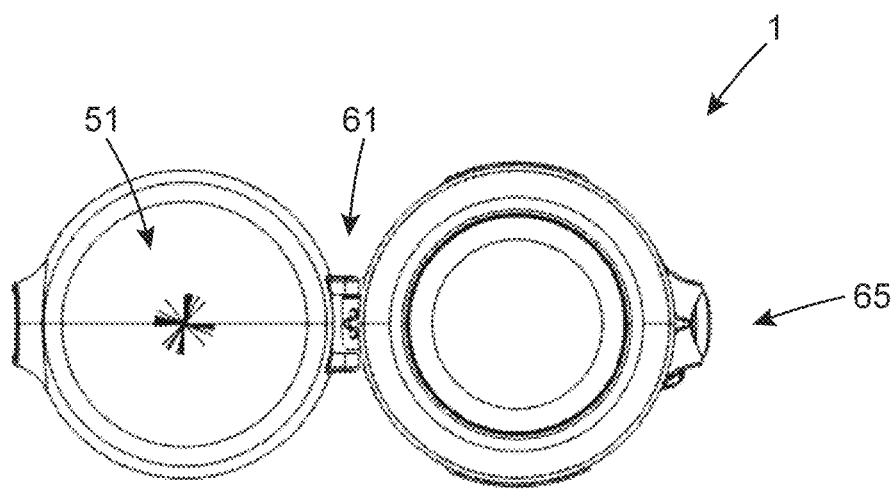
FIG. 16 is a bottom plan view of what is shown in FIG. 11.
Figure 17:
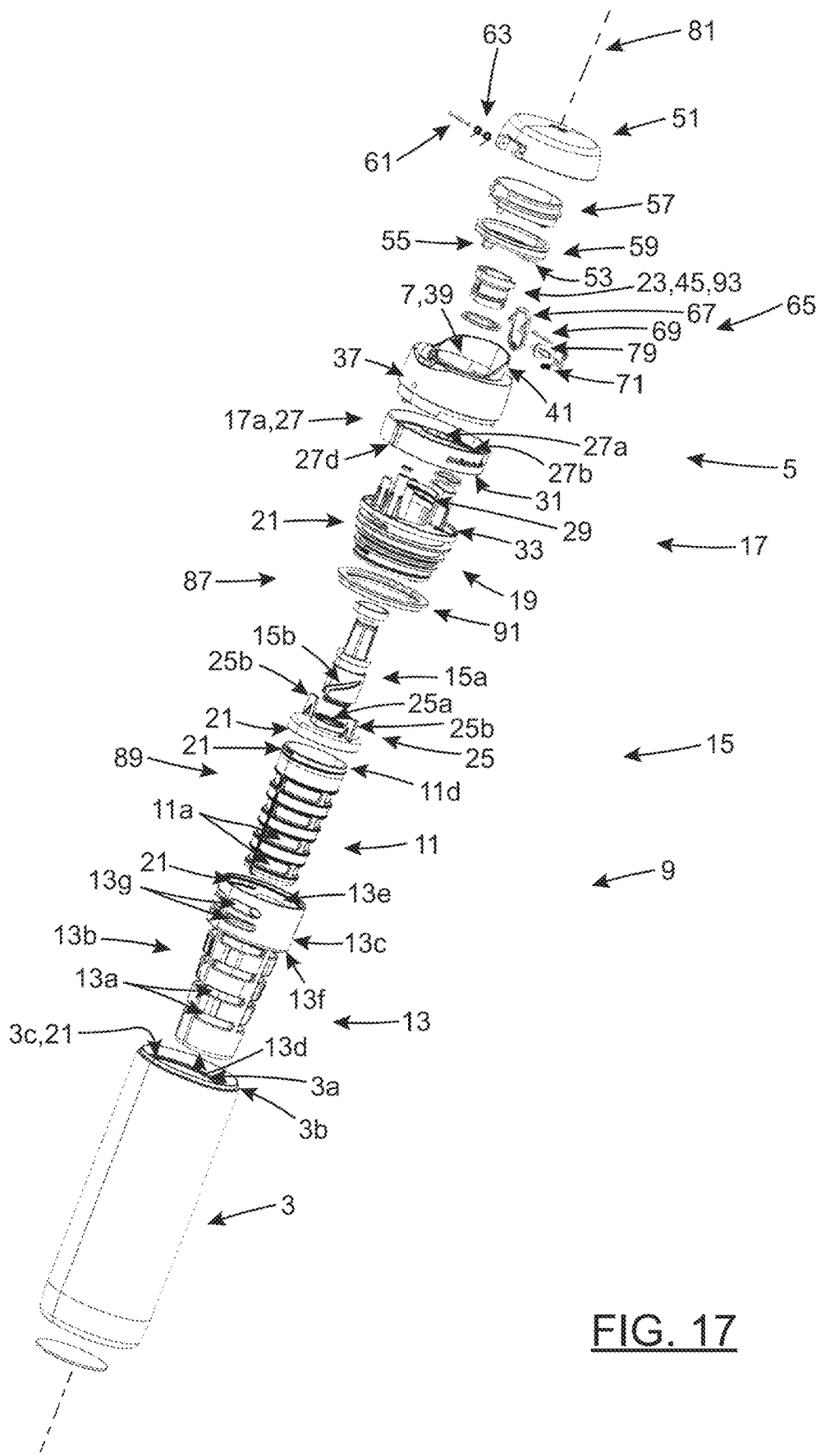
FIG. 17 is an exploded view of the containment vessel provided with an integrated infusion assembly shown in FIG. 1, to better illustrate outer and inner components, as well as cooperation of said components according to a possible embodiment of the present invention.
Figure 18:
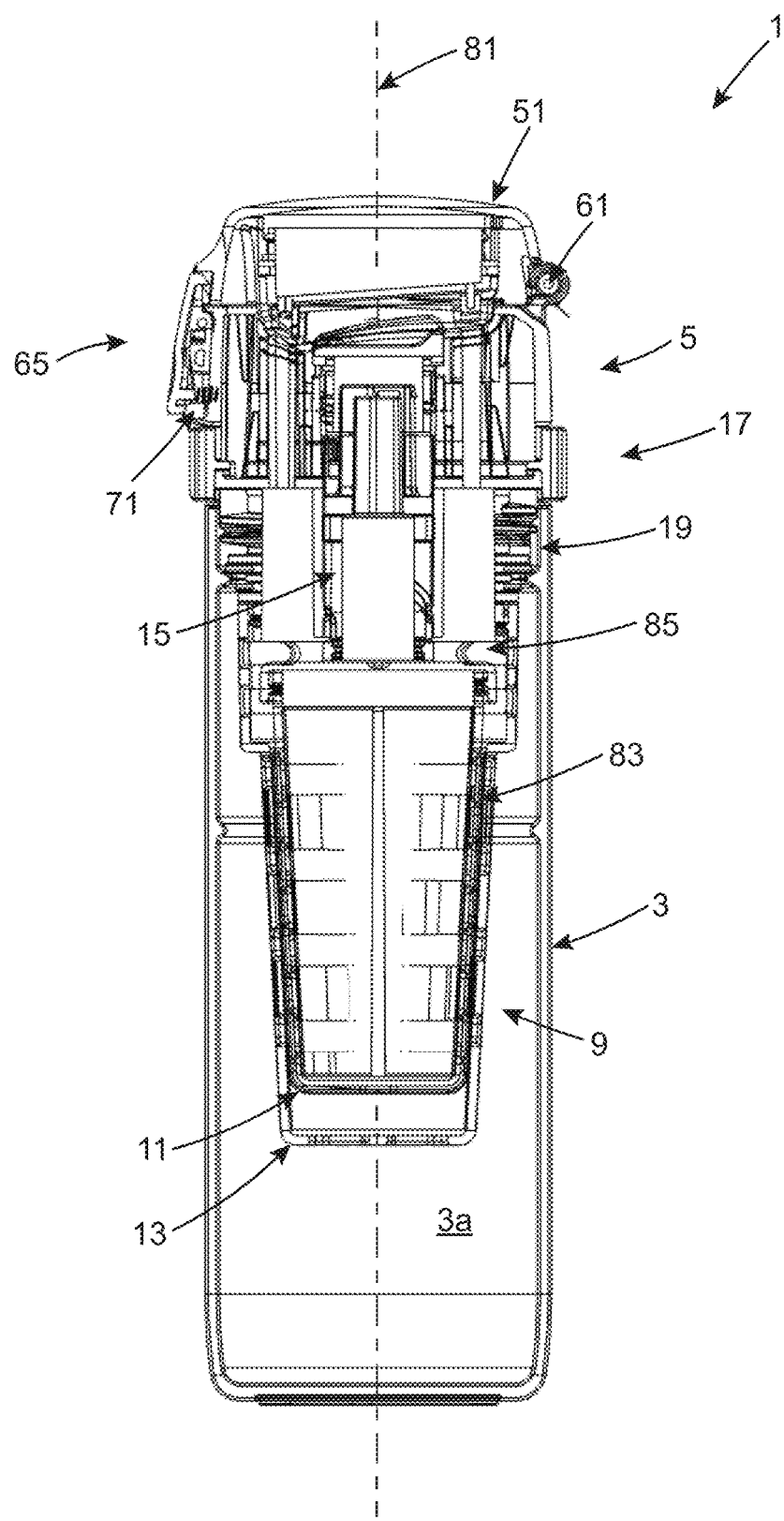
FIG. 18 is a cross-sectional view taken along line XVI-XVI of FIG. 3 once again to better illustrate outer and inner components, as well as cooperation of said components according to a possible embodiment of the present invention.
Figure 19:
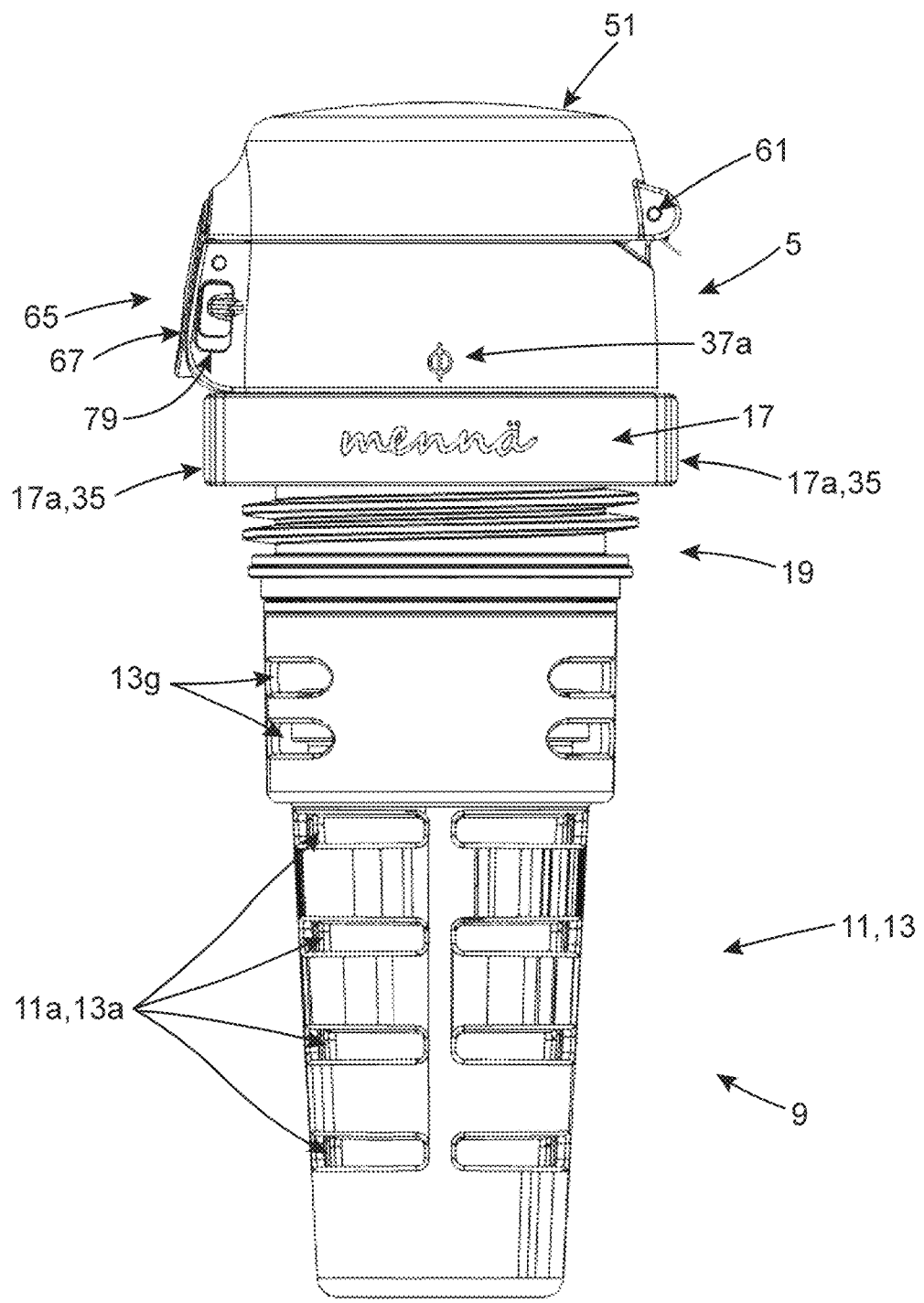
FIG. 19 is a side left-side elevational view of the integrated infusion assembly of FIG. 15 and corresponding cap component being now shown in an assembled configuration according to a possible embodiment of the present invention, the lid being shown in a closed configuration.
Figure 20:
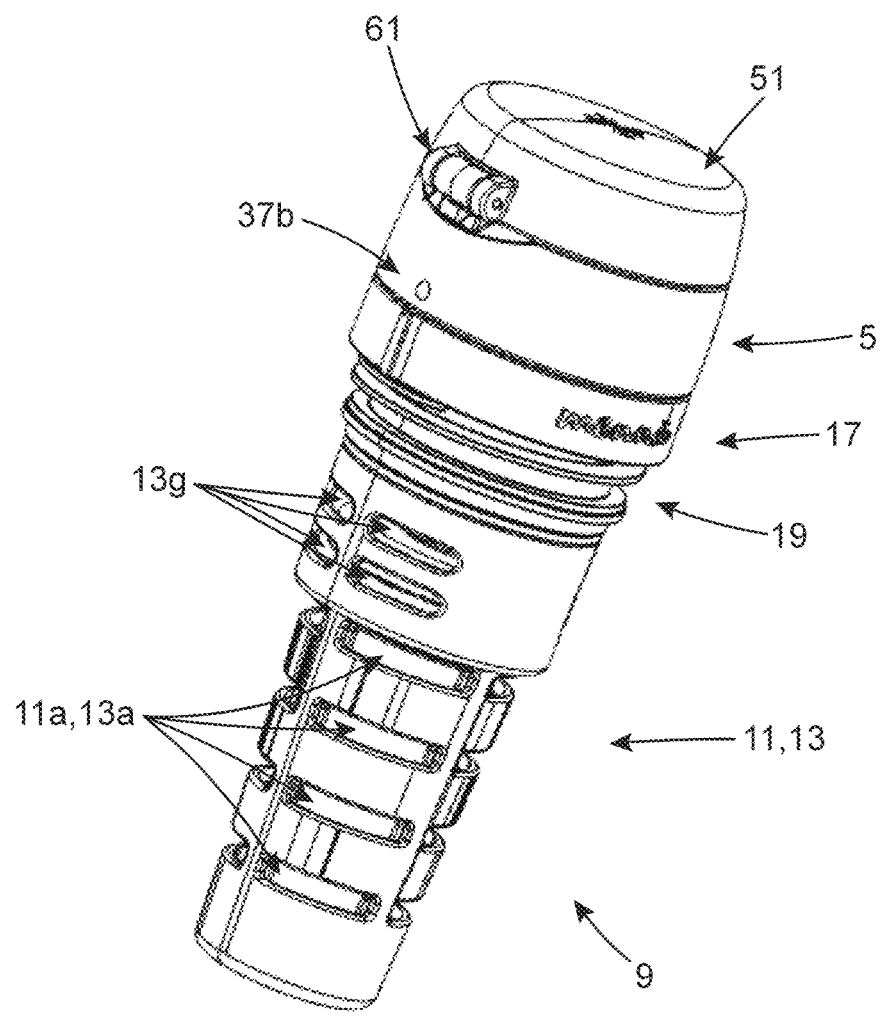
FIG. 20 is a rear perspective view of what is shown in FIG. 19.
Figure 21:
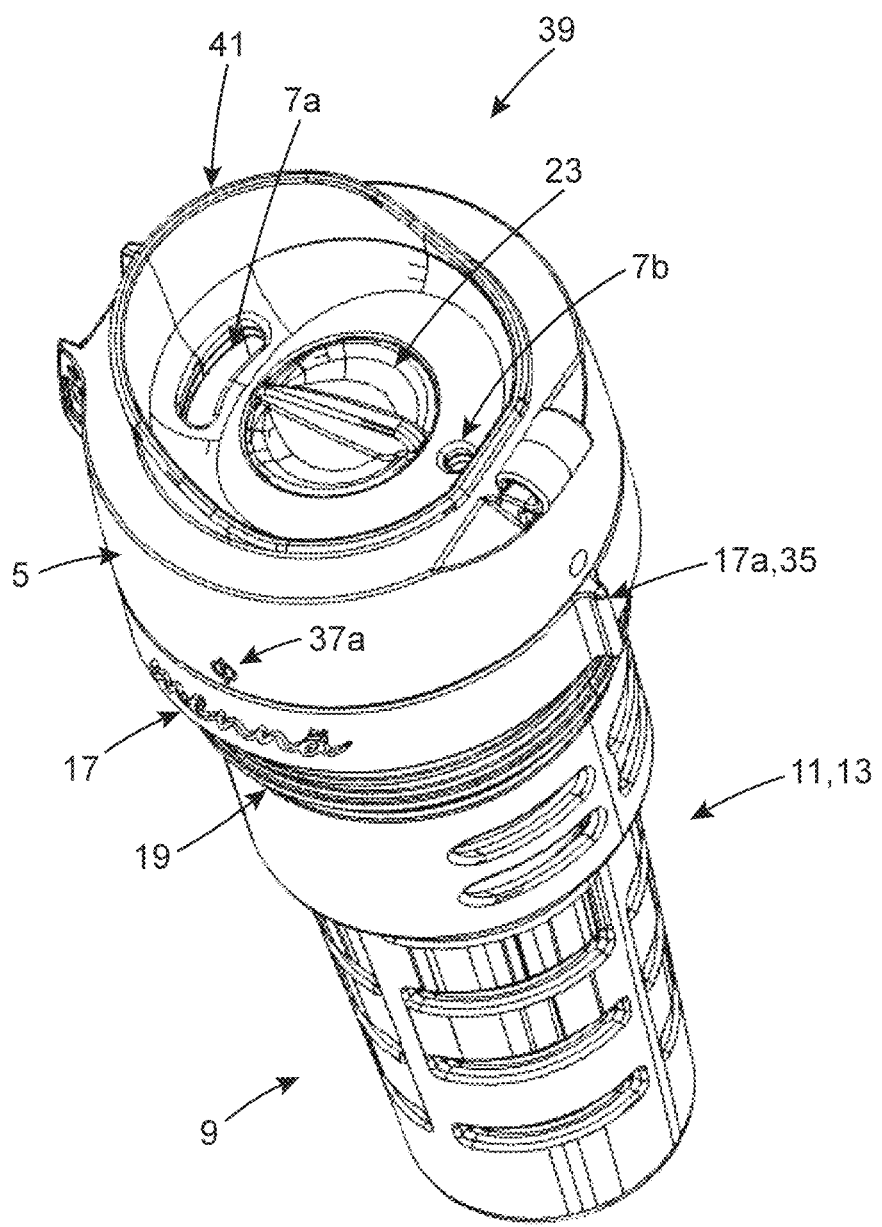
FIG. 21 is a front perspective view of what is shown in FIG. 20, the cap component being now shown removed to better illustrate a top portion of the integrated infusion assembly according to a possible embodiment of the present invention.
Figure 22:
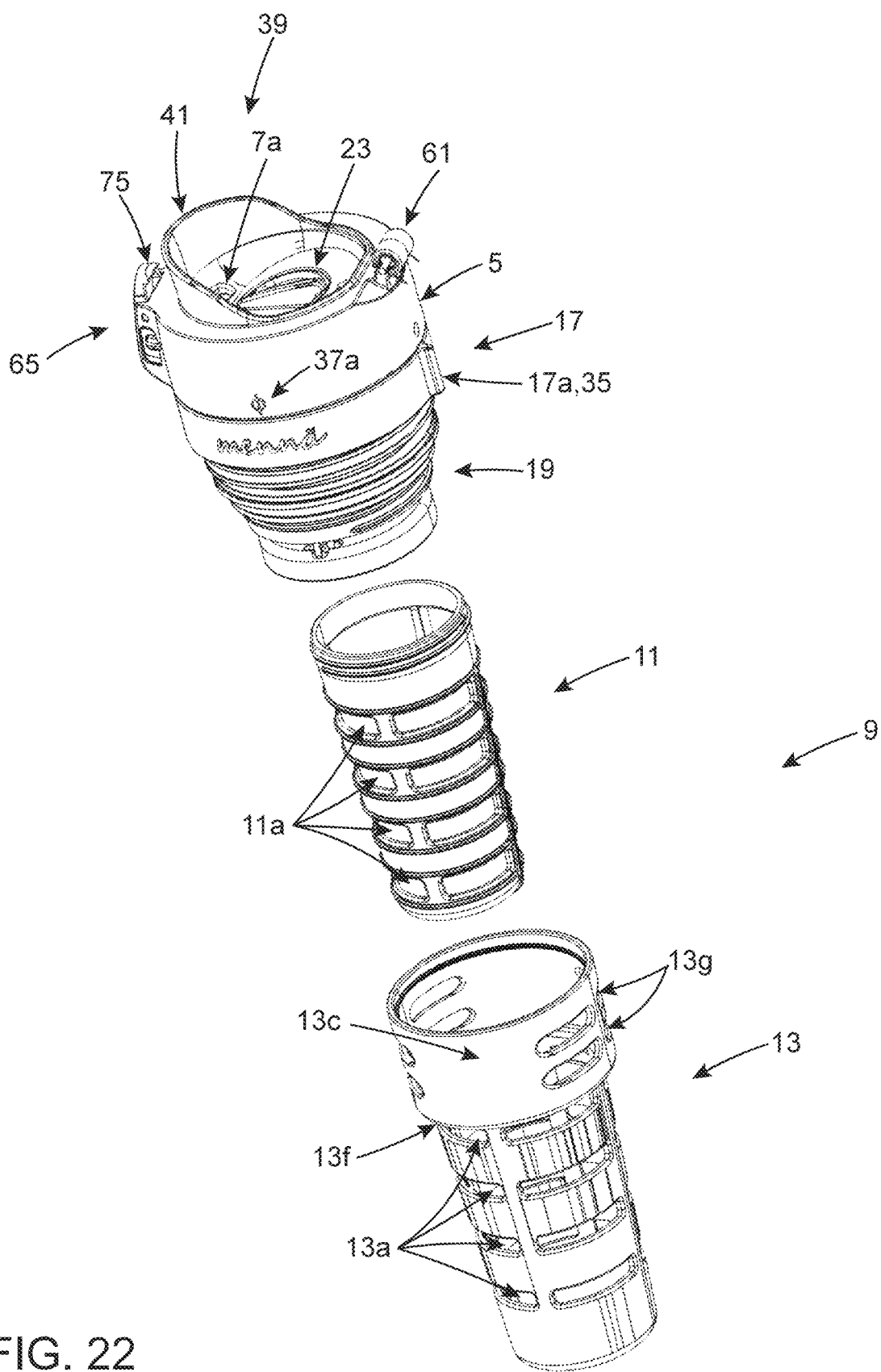
FIG. 22 is an exploded view of what is shown in FIG. 21, to better illustrate outer and inner components, as well as cooperation of said components according to a possible embodiment of the present invention.
Figure 23:
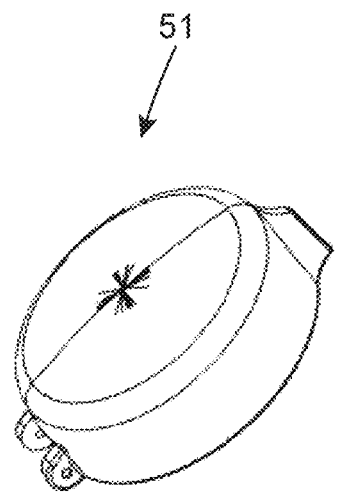
Figure 24:
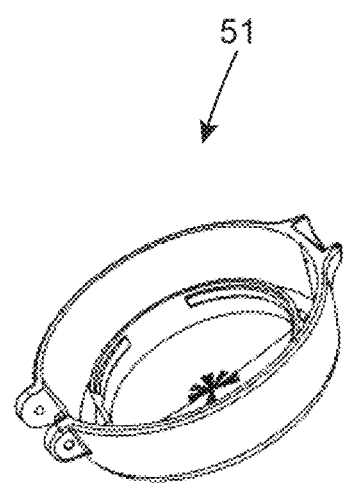
Figure 25:
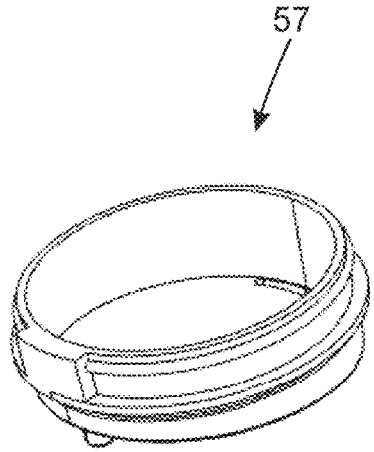
Figure 26:
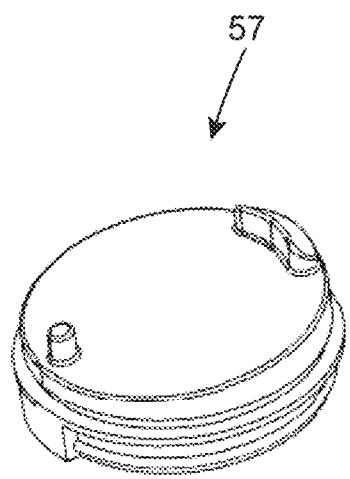
Figure 27:
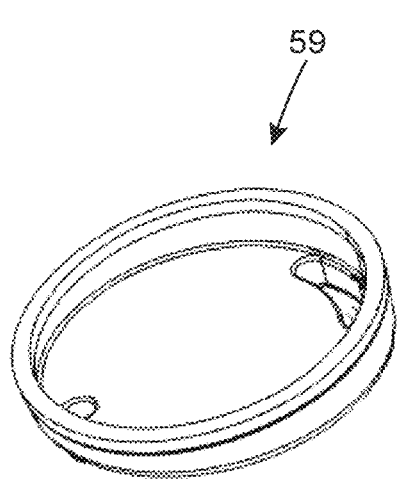
Figure 28:
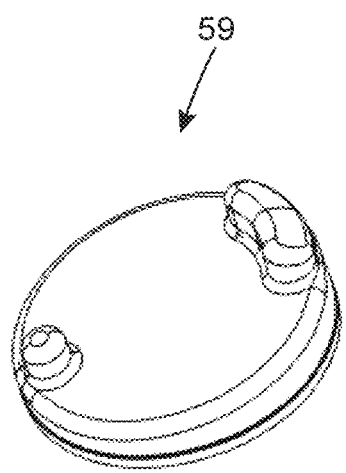
Figure 29:
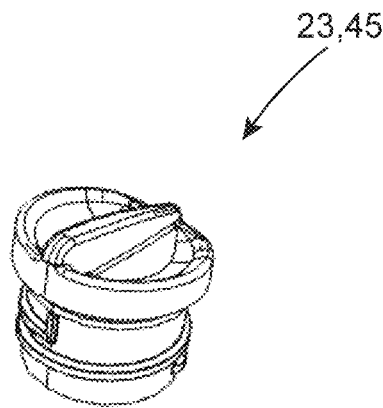
Figure 30:
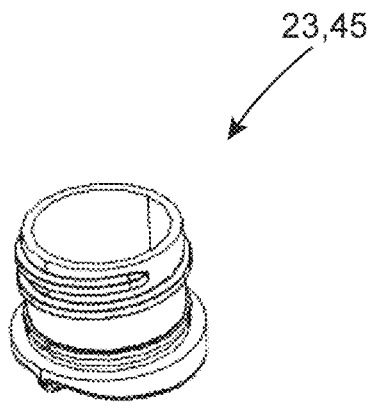
Figure 31:
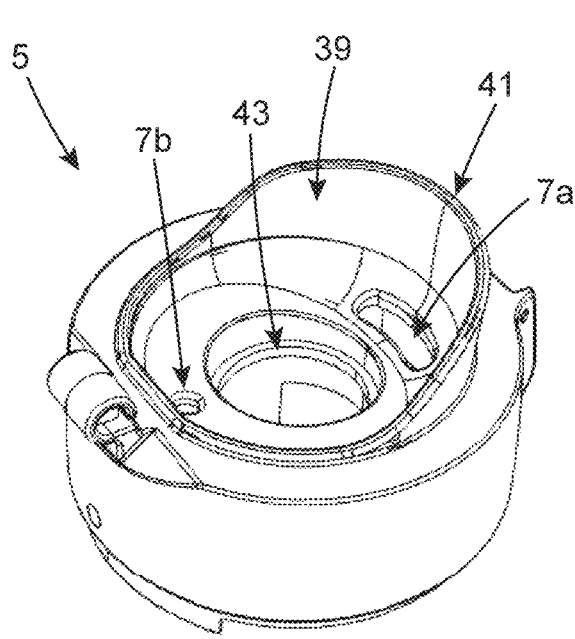
Figure 32:
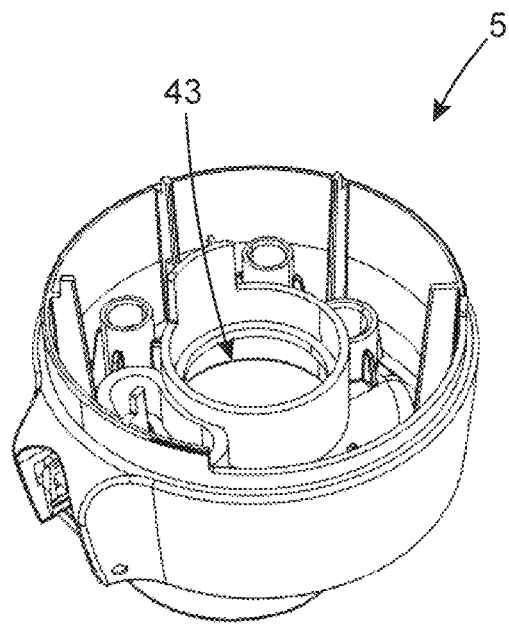
Figure 33:
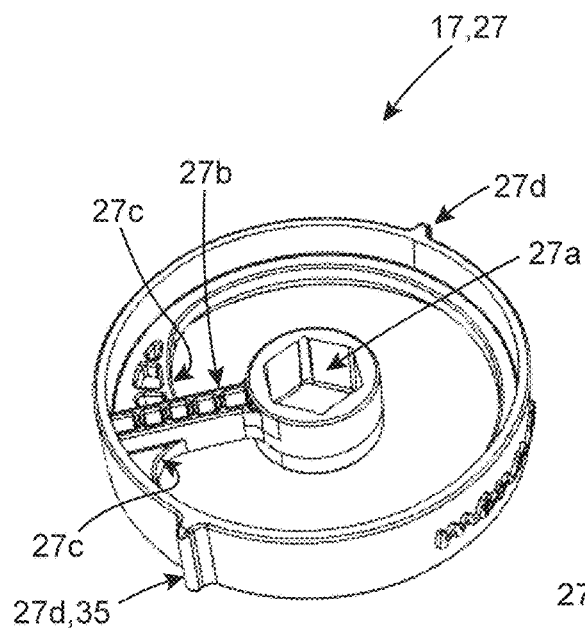
Figure 34:
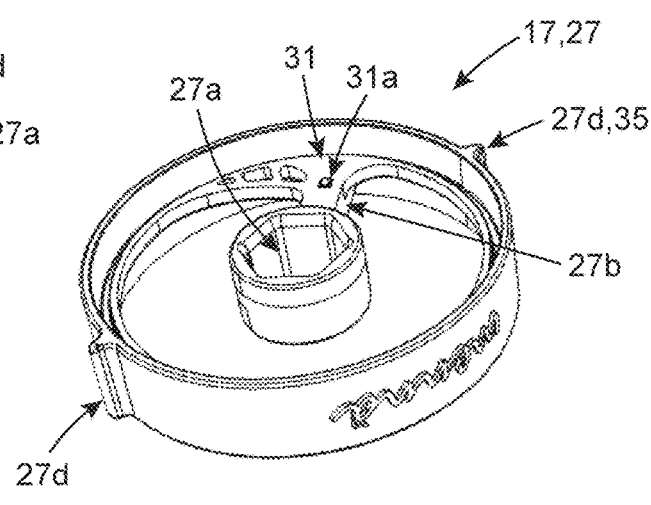
Figure 35:
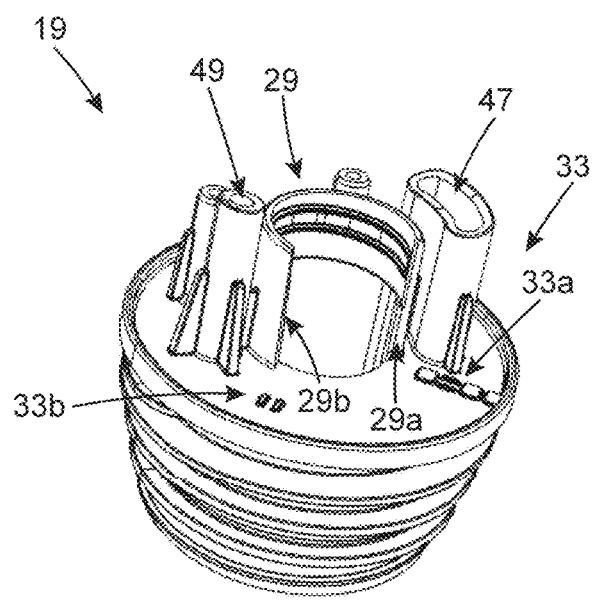
Figure 36:
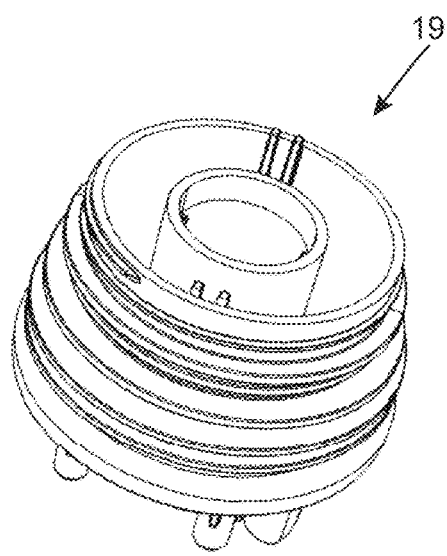
Figure 37:
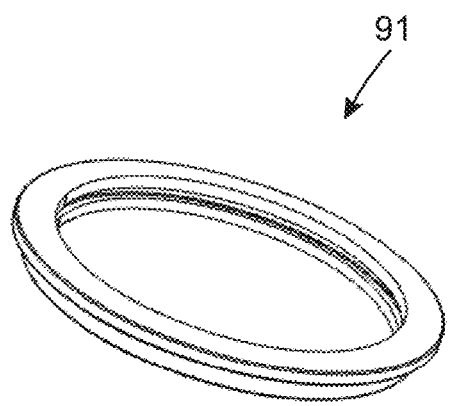
Figure 38:
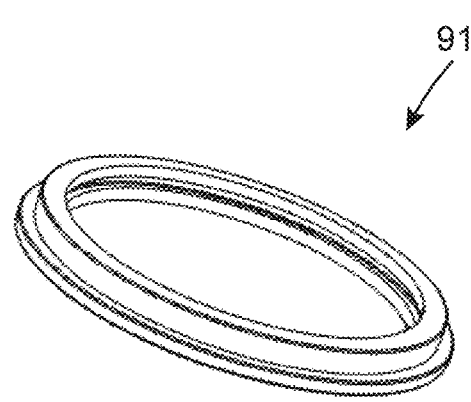
Figure 39:
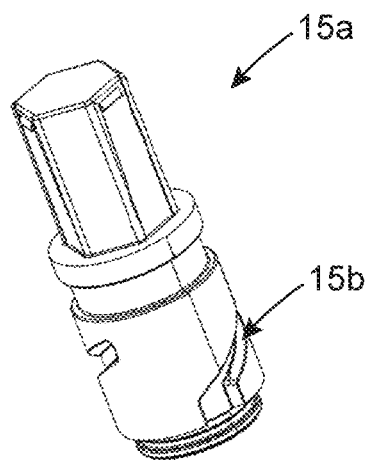
Figure 40:
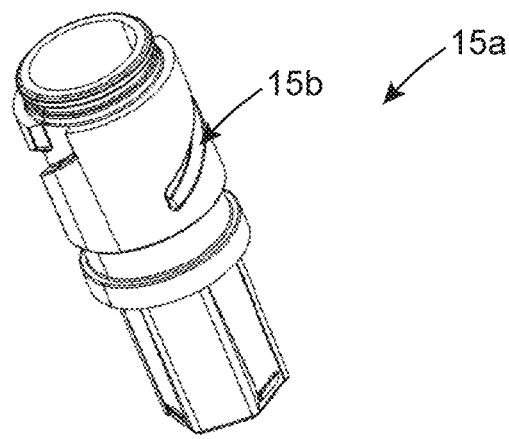
Figure 41:
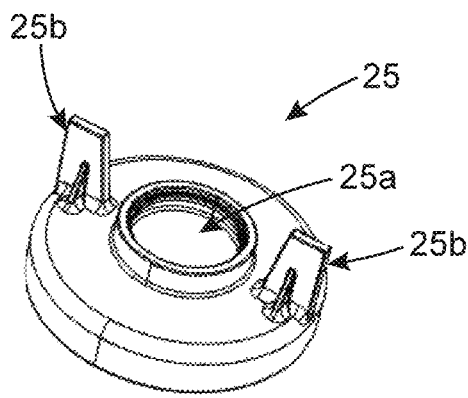
Figure 42:
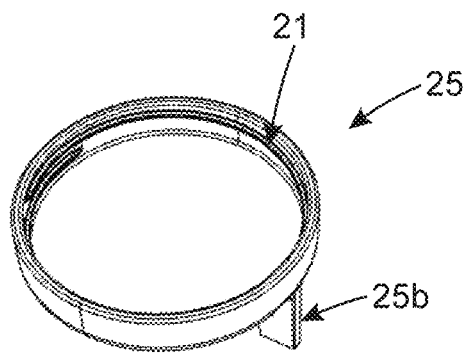
Figure 43:
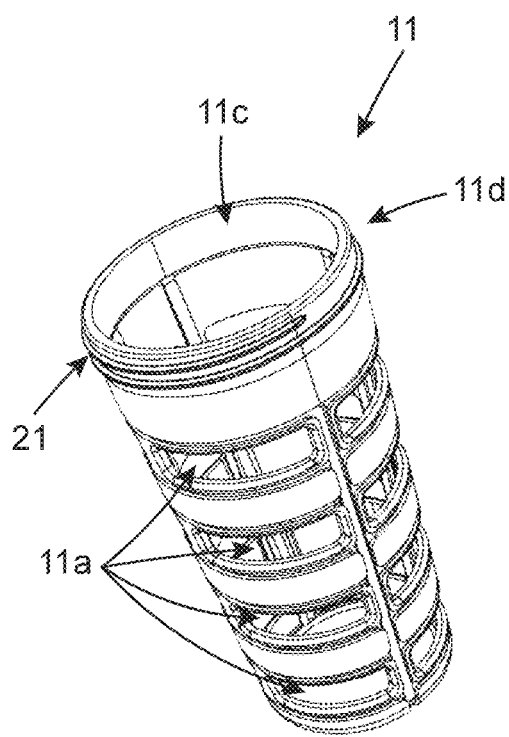
Figure 44:
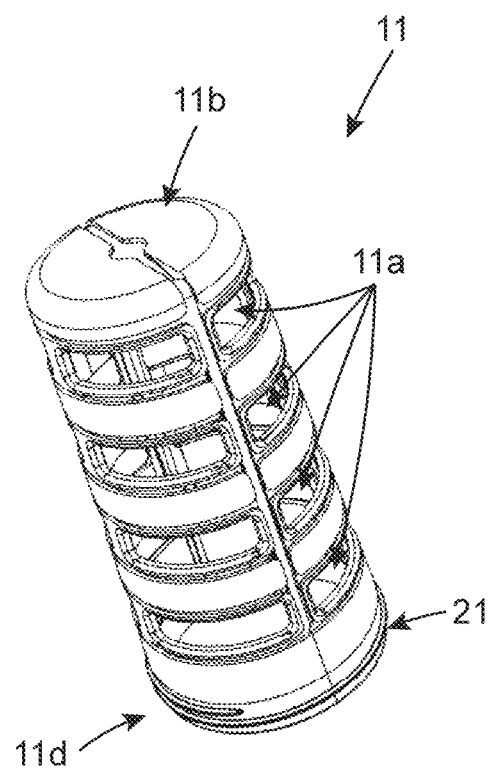
Figure 45:
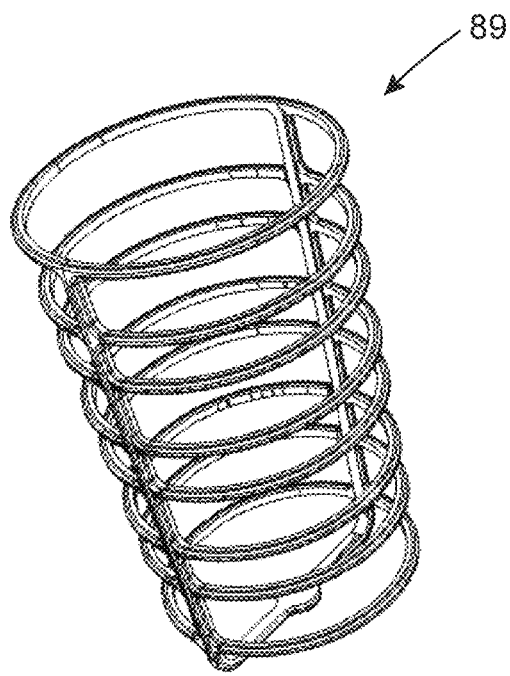
Figure 46:
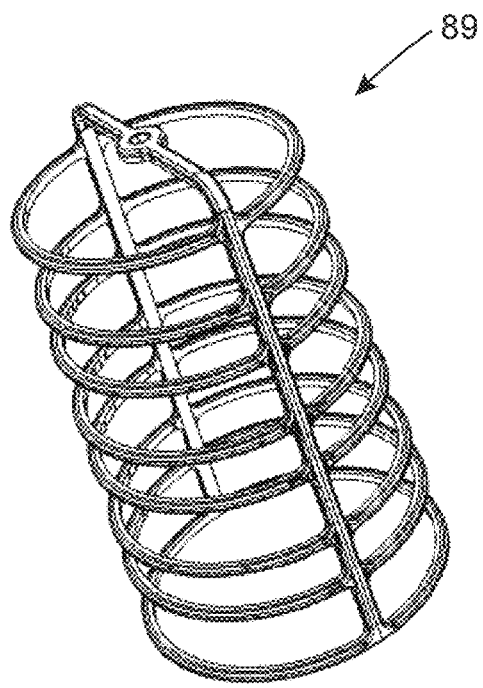
Figure 47:
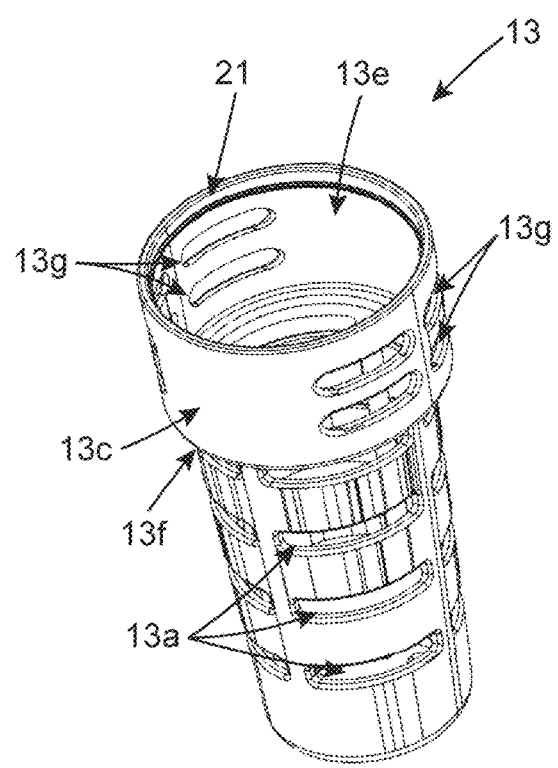
Figure 48:
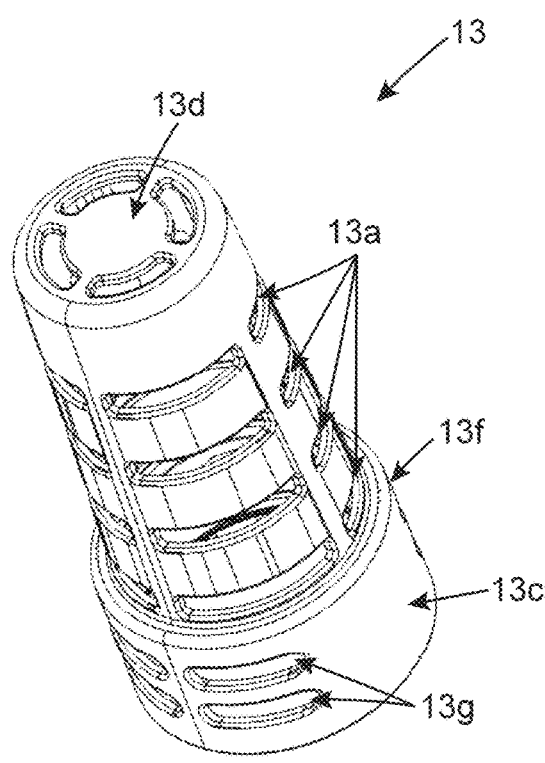

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions (expressed in inches, for example) shown in the figures are preferred, for exemplification purposes only.

Moreover, although the present invention was primarily designed as an infusion system for use with various types of substances (ex. solid substances, leaves, beans, particles, etc.), such as tea, coffee and the like, it may be used with other types of objects, and in other fields, as apparent to a person skilled in the art. For this reason, expressions such as "infusion", "solid", "tea", "coffee", etc., used herein should not be taken as to limit the scope of the present invention and include all other kinds of objects or fields with which the present invention could be used and may be useful, as apparent to a person skilled in the art.

Moreover, in the context of the present invention, the expressions "infuser", "system", "device", "product", "apparatus", "unit", "component", "equipment", "method", "kit" and "assembly", as well as any other equivalent expressions and/or compounds word thereof known in the art will be used interchangeably, as apparent to a person skilled in the art. This applies also for any other mutually equivalent expressions, such as, for example: a) "infusing", "steeping", "brewing", "soaking", "producing", "making", "processing", "altering", "modifying", "changing", etc.; b) "tea", "leaf", "coffee", "bean", "solid", "substance", "material", "product", etc.; c) "water", "liquid", "fluid", etc.; c) "vessel", "body", "shell", "chassis", "support", "frame", etc.; d) "selecting", "adjusting", "stopping", "reducing", "diminishing", "preventing", etc. e) "hollow", "cavity", "hole", "recess", "orifice", "groove", "passage", "channel", "conduit", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects will have an implicit "longitudinal axis" or "centerline", such as the longitudinal axis of a shaft, or the centerline of a hole, for example (and as a result, there is a "transversal axis" being substantially "perpendicular" for each longitudinal axis, etc.), and that expressions such as "connected" and "connectable", or "mounted" and "mountable", may be interchangeable, in that the present invention also relates to a kit with corresponding components for assembling a resulting fully assembled and operational infusion system, for use with various types of substances, such as teas and the like (and/or the present invention also relates to a containment vessel provided with at least one of such infusion system(s), to a kit for assembling the same (ex. infusion system, containment vessel, associated accessory, etc.), and to corresponding methods of manufacturing, operating and/or use associated thereto, etc.).

Moreover, components of the infusion system, containment vessel, associated accessory(ies) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

In addition, although the preferred embodiment of the present invention as illustrated in the accompanying drawings may comprise various components, and although the preferred embodiments of the infusion system, containment vessel, accessory and/or associated method(s) (ex. of manufacturing, assembling, operating, use, etc.) may consist of certain preferred steps and components as explained herein, not all of these steps and components are essential to the invention and thus should not be taken in their restrictive sense, i.e. should not be taken as to limit the scope of the present invention. It is to be understood, as also apparent to a person skilled in the art, that other suitable steps, components and cooperation thereinbetween, may be used for selectively adjusting the time of an infusion of a substance (ex. tea, etc.) within a containment vessel, and corresponding structural infusion system (as well as corresponding components thereof) according to the present invention, as will be briefly explained hereinafter and as can be easily inferred herefrom by a person skilled in the art, without departing from the scope of the invention.

Broadly described, the present invention, as illustrated in the accompanying drawings, relates to a new and improved infusion system that enables to infuse substances, such as tea and the like, in a more efficient, more precise, more accurate, more reliable, more adjustable, more versatile, more adaptable, more controlled, more timely, and/or more desirable manner (ex. depending on one's specific needs and/or preferences, etc., and/or the intended results, etc.).

The present system is particularly advantageous in that it provides a system for controlling the infusion "time", and to "stop" (or at the very least, substantially "reduce", etc.) the infusion of the tea leaves at the desired steep "concentration" (ex. content, flavor, time, etc.).

Indeed, the present infusion system is particularly advantageous in that, by virtue of its design, components and features, as better described and illustrated herein, it enables to infuse substances, such as tea and the like, in a more efficient, more precise, more accurate, more reliable, more adjustable, more versatile, more adaptable, more controlled, more timely, and/or more desirable manner (ex. depending on one's specific needs and/or preferences, etc.).

The present containment vessel (1) and corresponding infusion system (3) may come in the form of an infusion system which may include (or not) one and/or several of the following possible components and features (and/or different possible combination(s) and/or permutation(s) thereof), as well as possible equivalent mechanical equivalent(s):

1. A containment vessel (1) with integrated infusion capability for infusing a solid substance with a liquid, the containment vessel (1) comprising:

a main containment body (3) having a containment volume (3a) for containing the liquid;

a dispensing assembly (5) being removably mountable onto the main containment body (3), and having at least one fluid port (7) being fluidly connectable to the containment volume (3a) of the main containment body (3), for dispensing fluid through said at least one fluid port (7);

an infusion assembly (9) operatively mountable between the main containment body (3) and the dispensing assembly (5), the infusion assembly (9) having inner and outer infusion components (11,13) insertable into the containment volume (3a) of the containment body (3) for cooperation with the liquid, a first one of the infusion components (11,13) being operatively mountable onto the main containment body (3), with the inner component (11) being positioned, shaped and sized for containing the solid substance to be steeped into the liquid of the main containment body (3), the infusion components (11,13) being each provided with at least one hole (11a,13a), and a second one of the infusion components (11,13) being moveable with respect to the first one, so as to allow the infusion assembly (9) to be operable between an active mode, where at least one operative hole of the outer infusion component (13) is aligned with at least one corresponding operative hole of the inner infusion component (11) in order to define a fluid passage where infusion of the solid substance takes place with the liquid present in the main containment body (3), and an inactive mode, where the at least one operative hole of the outer infusion component (13) is misaligned with the at least one corresponding operative hole of the inner infusion component (11) in order to selectively close the fluid passage and thus selectively stop an infusion process of the solid substance with the liquid present inside the main containment body (3);

a transmission assembly (15) operatively connectable to the infusion assembly (9) for mechanically driving the infusion assembly (9) between the active and inactive modes; and an actuating assembly (17) operatively connectable to the transmission assembly (15) for displacing one of the inner and outer infusion components (11,13) with respect to the other via the transmission assembly (15), so as to in turn selectively operate the infusion assembly (9) between the active and inactive modes, the actuating assembly (17) being manually operated and having at least one actuating component (17a) being provided about a peripheral surface of the containment vessel (1).

2. A containment vessel (1) according to any one of the preceding combination(s), wherein the containment vessel (1) comprises a base component (19) for selectively covering an upper opening (3b) of the main containment body (3), the base component (19) being mechanically connectable (ex. via threading, via clip, via interlocking, via pressing-fitting, and/or etc.) onto a corresponding collar portion (3c) of the main containment body (3).

3. A containment vessel (1) according to any one of the preceding combination(s), wherein complementary threading (21) is provided about the base component (19) and corresponding collar portion (3c) of the main containment body (3) respectively.

4. A containment vessel (1) according to any one of the preceding combination(s), wherein complementary threading (21) is also provided about the outer infusion component (13) for allowing the base component (19) to be mechanically connectable onto a corresponding collar portion (13b) of the outer infusion component (13) as well.

5. A containment vessel (1) according to any one of the preceding combination(s), wherein the base component (19) is provided with the at least one actuating component (17a) of the actuating assembly (17), said actuating component (17a) being operatively connectable to at least one of the inner and outer infusion components (11,13) for selectively operating the infusion assembly (9) between the active and inactive modes.

6. A containment vessel (1) according to any one of the preceding combination(s), wherein the transmission assembly (15) includes an assembly knob (23) operatively mountable about a top portion of the base component (19), said assembly knob (23) being operatively connectable to said at least one of the inner and outer components (11,13) via a transmission link (15a) of the transmission assembly (15), for allowing a relative rotation between said inner and outer infusion components (11,13), in order to selectively operate the infusion assembly (9) between the active and inactive modes, via a corresponding operation of the actuating assembly (17).

7. A containment vessel (1) according to any one of the preceding combination(s), wherein the transmission link (15a) is disposed centrally about the base component (19) and/or infusion assembly (9), and is configured for operatively interconnecting the assembly knob (23) to the inner infusion component (11), so that securing of the assembly knob (23) onto the base component (19) in turn forces a relative movement of the inner infusion component (11) with respect to the outer infusion component (13) when the actuating assembly (17) is operated.

8. A containment vessel (1) according to any one of the preceding combination(s), wherein the transmission link (15a) comprises an extremity being operatively being mechanically connectable (ex. via threading, via clip, via interlocking, via press-fitting, and/or etc.) onto a corresponding upper portion of the inner infusion component (11).

9. A containment vessel (1) according to any one of the preceding combination(s), wherein the extremity of the transmission link (15a) is mechanically connectable (ex. via threading, via clip, via interlocking, via press-fitting, and/or etc.) onto a corresponding recess (25a) of a cap (25) of the inner infusion component (11).

10. A containment vessel (1) according to any one of the preceding combination(s), wherein the transmission link (15a) comprises a peripheral groove (15b) being positioned, shaped and sized for operatively engaging a corresponding inner component of the base component (19) so that a corresponding rotation of the actuating assembly (17) in turn vertically displaces the inner infusion component (11) with respect to the outer infusion component (13), thereby enabling the infusion assembly (9) to be selectively operated between the active and inactive modes via the actuating assembly (17).

11. A containment vessel (1) according to any one of the preceding combination(s), wherein the actuating component (17a) of the actuating assembly (17) includes an actuating ring (27) disposed about a corresponding outer portion of the base component (19), said actuating ring (27) being mechanically connectable to said at least one of the inner and outer components (11,13) via the transmission assembly (15), for allowing a relative movement between said inner and outer infusion components (11,13), in order to selectively operate the infusion assembly (9) between the active and inactive modes, via a corresponding rotation of the actuating ring (27).

12. A containment vessel (1) according to any one of the preceding combination(s), wherein the actuating ring (27) is provided with a central socket (27a) for mechanical receiving a segment of the transmission link (15a).

13. A containment vessel (1) according to any one of the preceding combination(s), wherein the central socket (27a) is a bore having a cross-sectional profile with n sides, n being an integer equal to or greater than 1.

14. A containment vessel (1) according to any one of the preceding combination(s), wherein the central socket (27a) has 6 sides, and thus, the central socket (27a) is an hexagonal bore.

15. A containment vessel (1) according to any one of the preceding combination(s), wherein the central socket (27a) is connected to a main peripheral body of the actuating ring (27) via at least one radial arm (27b).

16. A containment vessel (1) according to any one of the preceding combination(s), wherein the at least one radial arm (27b) is provided with at least one reinforcement portion (27c).

17. A containment vessel (1) according to any one of the preceding combination(s), wherein the base component (19) is provided with a protruding stoppage wall (29) for delimiting a specific range of rotation of the at least one radial arm (27b) and corresponding actuating ring (27) about the base component (19).

18. A containment vessel (1) according to any one of the preceding combination(s), wherein the protruding stoppage wall (29) is positioned, shaped and sized so that a first end (29a) of the protruding stoppage wall (29) abutting against the at least one radial arm (27b) corresponds to the active mode of the infusion assembly (9), and so that a second end (29b) of the protruding stoppage wall (29) abutting against the at least one radial arm (27b) corresponds to the inactive mode of the infusion assembly (9).

19. A containment vessel (1) according to any one of the preceding combination(s), wherein the protruding stoppage wall (29) is an arched wall.

20. A containment vessel (1) according to any one of the preceding combination(s), wherein the actuating ring (27) comprises at least one interlocking component (31) for removably interlocking with a corresponding positioning component (33) of the base component (19) for selectively maintaining the infusion assembly (9) in place, in the active and inactive modes, respectively.

21. A containment vessel (1) according to any one of the preceding combination(s), wherein the at least one interlocking component (31) includes at least one clip (31a) being insertable into a corresponding first notch (33a) of the base component (19) adjacent to a first end (29a) of the stoppage wall (29) and corresponding to a first mode of the infusion assembly (9).

22. A containment vessel (1) according to any one of the preceding combination(s), wherein the at least one clip (31a) is further insertable into a corresponding second notch (33b) of the base component (19) adjacent to a second end (29b) of the stoppage wall (29) and corresponding to a second mode of the infusion assembly (9).

23. A containment vessel (1) according to any one of the preceding combination(s), wherein the at least one clip (31a) is provided about a corresponding radial arm of the actuating ring.

24. A containment vessel (1) according to any one of the preceding combination(s), wherein the actuating ring comprises at least one finger-receiving component (27d) for facilitating operation and corresponding rotation of the actuating ring (27) by a user of the containment vessel (1).

25. A containment vessel (1) according to any one of the preceding combination(s), wherein the at least one finger-receiving component (27d) includes a pair of distally-spaced projecting flanges (35) being provided about the actuating ring (27).

26. A containment vessel (1) according to any one of the preceding combination(s), wherein the at least one finger-receiving component (27d) is moveable with respect to the dispensing assembly (5), and is capable of being aligned with at least one corresponding visual symbol (37) provided about the dispensing assembly (5), said at least one corresponding visual symbol (37) being representative of a corresponding infusion mode of the infusion assembly (9).

27. A containment vessel (1) according to any one of the preceding combination(s), wherein the dispensing assembly (5) comprises a spout component (39) being operatively mountable onto the base component (19).

28. A containment vessel (1) according to any one of the preceding combination(s), wherein the spout component (39) comprises first and second visual symbols (37a,37b) representative of the active and inactive modes respectively of the infusion assembly (9), said visual symbols (37) being used for assisting and guiding an operation of the actuating ring (27) between the two modes.

29. A containment vessel (1) according to any one of the preceding combination(s), wherein the spout component (39) comprises a main fluid port (7a), and a secondary fluid port (7b).

30. A containment vessel (1) according to any one of the preceding combination(s), wherein the main fluid port (7a) is positioned, shaped and sized for allowing a user of the containment vessel (1) to drink liquid from said main fluid port (7a), and wherein the secondary fluid port (7b) is positioned, shaped and sized for assisting in allowing an air circulation between an inside of the containment vessel (1) and an outside thereof.

31. A containment vessel (1) according to any one of the preceding combination(s), wherein the main fluid port (7a) has a cross-sectional area and corresponding fluid flow capability being greater than that of the secondary fluid port (7b).

32. A containment vessel (1) according to any one of the preceding combination(s), wherein the main fluid port (7a) is a curved fluid port, and wherein the secondary fluid port (7b) is a circular fluid port.

33. A containment vessel (1) according to any one of the preceding combination(s), wherein the containment vessel (1) comprises a spouting wall (41) adjacent to the main fluid port (7a), for receiving fluid being dispensed from said main fluid port (7a).

34. A containment vessel (1) according to any one of the preceding combination(s), wherein the main fluid port (7a) and the secondary fluid port (7b) are separated by a corresponding recess (43) for receiving a corresponding assembly component (45) of the containment vessel (1).

35. A containment vessel (1) according to any one of the preceding combination(s), wherein the base component (19) comprises first and second conduits (47,49) configured for fluidly connecting the main and second fluid ports (7a,7b) respectively of the spout component (39) to the containment volume (3a) of the main containment body (3).

36. A containment vessel (1) according to any one of the preceding combination(s), wherein the spout component (39) is provided with a cap component (51) operable between opened and closed configurations.

37. A containment vessel (1) according to any one of the preceding combination(s), wherein the cap component (51) comprises first and second sealing components (53,55) for removably sealing off the main and secondary fluid ports (7a,7b) of the spout component (39) when the cap component (51) is operated into the closed configuration.

38. A containment vessel (1) according to any one of the preceding combination(s), wherein the first and second sealing components (53,55) are mechanically connectable (ex. via threading, via clip, via interlocking, via press-fitting, and/or etc.) onto a corresponding bottom portion of the cap component (51).

39. A containment vessel (1) according to any one of the preceding combination(s), wherein the first and second sealing components (53,55) are mechanically connectable onto the corresponding bottom portion of the cap component (51) via a common single sealing assembly (57).

40. A containment vessel (1) according to any one of the preceding combination(s), wherein the common single sealing assembly (57) is covered by a complementary cover (59) made of flexible sealing material.

41. A containment vessel (1) according to any one of the preceding combination(s), wherein the cap component (51) is hingedly mountable about the spout component (39) via at least one pivot pin (61), and is spring-loaded via at least one corresponding spring (63), the cap component (51) being further configured to be biased by default into the opened configuration via a biasing force of said least one corresponding spring (63).

42. A containment vessel (1) according to any one of the preceding combination(s), wherein the containment vessel (1) comprises a securing component (65) cooperable between the base component (19) and the cap component (51) for maintaining said cap component (51) in the closed configuration.

43. A containment vessel (1) according to any one of the preceding combination(s), wherein the securing component (65) comprises a push-button (67) operable between opened and closed configurations.

44. A containment vessel (1) according to any one of the preceding combination(s), wherein the push-button (67) is hingedly mountable about the base component (19) via at least one pivot pin (69), and is spring-loaded via at least one corresponding spring (71), the push-button component (67) being further configured to be biased by default into the closed configuration via a biasing force of said least one corresponding spring (71), and wherein overriding of said biasing force is done by manually pushing on one side of the push-button (67).

45. A containment vessel (1) according to any one of the preceding combination(s), wherein said one side of the push-button (67) is provided with a corresponding recess (73) for receiving a corresponding finger of a user of the containment vessel (1).

46. A containment vessel (1) according to any one of the preceding combination(s), wherein another side of the push-button (67) is provided with a latching portion (75) for latching onto a corresponding bulge (77) of the cap component (51).

47. A containment vessel (1) according to any one of the preceding combination(s), wherein the containment vessel (51), comprises a locking mechanism (79) cooperable between the base component (19) and the push-button (67) for maintaining said push-button (67) in the closed configuration.

48. A containment vessel (1) according to any one of the preceding combination(s), wherein the inner and outer infusion components (11,13) include housings that are complementary to one another.

49. A containment vessel (1) according to any one of the preceding combination(s), wherein the inner and outer infusion components (11,13) include housings that are substantially cylindrical.

50. A containment vessel (1) according to any one of the preceding combination(s), wherein the inner and outer infusion components (11,13) are relatively rotatable with respect to one another.

51. A containment vessel (1) according to any one of the preceding combination(s), wherein the inner infusion component (11) is configured to be rotatable with respect to the outer infusion component (13).

52. A containment vessel (1) according to any one of the preceding combination(s), wherein the outer infusion component (13) is configured to be rotatable with respect to the inner infusion component (11).

53. A containment vessel (1) according to any one of the preceding combination(s), wherein the inner and outer infusion components (11,13) are configured to be oppositely rotatable with respect to one another.

54. A containment vessel (1) according to any one of the preceding combination(s), wherein one of the inner and outer infusion components (11,13) is operatively fixed with respect to the main containment body (3), and wherein the other one of the inner and outer infusion components (11,13) is rotatable with respect to the main containment body (3).

55. A containment vessel (1) according to any one of the preceding combination(s), wherein the inner and outer infusion components (11,13) are configured to be vertically displaced with respect to one another.

56. A containment vessel (1) according to any one of the preceding combination(s), wherein the inner infusion component (11) is configured to be vertically displaced with respect to the outer infusion component (13).

57. A containment vessel (1) according to any one of the preceding combination(s), wherein the inner and outer infusion components (11,13) share a common axis of rotation (81) (ex. a common pivot, a longitudinal axis of the infusion system, etc.).

58. A containment vessel (1) according to any one of the preceding combination(s), wherein the inner and outer infusion components (11,13) are concentric with respect to one another.

59. A containment vessel (1) according to any one of the preceding combination(s), wherein the inner infusion component (11) is provided with a plurality of holes (11a).

60. A containment vessel (1) according to any one of the preceding combination(s), wherein the inner infusion component (11) is provided with a plurality of rows and/or columns of holes (11a).

61. A containment vessel (1) according to any one of the preceding combination(s), wherein the holes (11a) of the inner infusion component (11) are circular.

62. A containment vessel (1) according to any one of the preceding combination(s), wherein the holes (11a) of the inner infusion component (11) are substantially rectangular.

63. A containment vessel (1) according to any one of the preceding combination(s), wherein the substantially rectangular holes (11a) of the inner infusion component (11) have rounded corners.

64. A containment vessel (1) according to any one of the preceding combination(s), wherein the holes (11a) of the inner infusion component (11) are disposed peripherally about a side wall of the inner infusion component (11).

65. A containment vessel (1) according to any one of the preceding combination(s), wherein the holes (11a) of the inner infusion component (11) are through-holes (11a).

66. A containment vessel (1) according to any one of the preceding combination(s), wherein the holes (11a) of the inner infusion component (11) are provided with a corresponding meshing (83) being positioned, shaped and sized for preventing the solid substance to stepped with the liquid from exiting the inner infusion component (11).

67. A containment vessel (1) according to any one of the preceding combination(s), wherein the inner infusion component (11) comprises a bottom wall (11b) and an upper open end (11c).

68. A containment vessel (1) according to any one of the preceding combination(s), wherein the containment vessel (1) comprises a cap (25) for selectively covering the upper open end (11c) of the inner infusion component (11), the cap (25) being mechanically connectable (ex. via threading, via clip, via interlocking, via press-fitting, and/or etc.) onto a corresponding rim portion (11d) of the inner infusion component (11).

69. A containment vessel (1) according to any one of the preceding combination(s), wherein complementary threading (21) is provided about the cap (25) and corresponding rim (11d) portion of the inner infusion component (11) respectively.

70. A containment vessel (1) according to any one of the preceding combination(s), wherein the cap (25) includes an upper recess (25a) for receiving therein a corresponding component of the transmission assembly (15).

71. A containment vessel (1) according to any one of the preceding combination(s), wherein the cap (25) includes at least one projecting flange (25b).

72. A containment vessel (1) according to any one of the preceding combination(s), wherein the cap (25) includes a pair of distally-spaced projecting flanges (25b) being provided about the cap (25).

73. A containment vessel (1) according to any one of the preceding combination(s), wherein the outer infusion component (13) is provided with a plurality of holes (13a).

74. A containment vessel (1) according to any one of the preceding combination(s), wherein the outer infusion component (13) is provided with a plurality of rows and/or columns of holes (13a).

75. A containment vessel (1) according to any one of the preceding combination(s), wherein the holes (13a) of the outer infusion component (13) are circular.

76. A containment vessel (1) according to any one of the preceding combination(s), wherein the holes (13a) of the outer infusion component (13) are substantially rectangular.

77. A containment vessel (1) according to any one of the preceding combination(s), wherein the substantially rectangular holes (13a) of the outer infusion component (13) have rounded corners.

78. A containment vessel (1) according to any one of the preceding combination(s), wherein the holes (13a) of the outer infusion component (13) are disposed peripherally about a side wall (13c) of the outer infusion component (13).

79. A containment vessel (1) according to any one of the preceding combination(s), wherein the holes (13a) of the outer infusion component (13) are through-holes.

80. A containment vessel (1) according to any one of the preceding combination(s), wherein the outer infusion component (13) comprises a bottom wall (13d) and an upper open end (13e).

81. A containment vessel (1) according to any one of the preceding combination(s), wherein outer infusion component (13) comprises a shouldering portion (13f), and wherein a collar portion (13b) of the outer infusion component (13) is provided about an upper part of said shouldering portion (13f).

82. A containment vessel (1) according to any one of the preceding combination(s), wherein the collar portion (13f) of the outer infusion component (13) comprises at least one orifice (13g) being positioned, shaped and sized for allowing a passage of fluid into a fluid channel (85) disposed within the base component (19), said fluid channel (85) being fluidly connected to the at least one fluid port (7) of the containment vessel (1), for allowing dispensing of fluid trough said at least one fluid port (7) during both the active and inactive modes of the infusion assembly (9), thereby bypassing the corresponding holes of the outer and inner infusion components (11,13) of the infusion assembly (9).

83. A containment vessel (1) according to any one of the preceding combination(s), wherein the collar portion (13b) of the outer infusion component (13) comprises a plurality of orifices (13g).

84. A containment vessel (1) according to any one of the preceding combination(s), wherein the orifices (13g) of the collar portion (13b) of the outer infusion component (13) are circular.

85. A containment vessel (1) according to any one of the preceding combination(s), wherein the orifices (13g) of the collar portion (13b) of outer infusion component (13) are substantially rectangular.

86. A containment vessel (1) according to any one of the preceding combination(s), wherein the orifices (13g) of the collar portion (13b) of the outer infusion component (13) are substantially elongated.

87. A containment vessel (1) according to any one of the preceding combination(s), wherein the substantially elongated orifices (13g) of the outer infusion component (13) have rounded corners.

88. A containment vessel (1) according to any one of the preceding combination(s), wherein the orifices (13g) of the outer infusion component (13) are disposed circumferentially about a bottom wall of the collar portion (13b) of the outer infusion component (13).

89. A containment vessel (1) according to any one of the preceding combination(s), wherein the infusion assembly (9) comprises guiding components (87) for guiding an assembly of constituting components (ex. inner and outer infusion components, base component (19), cap component, etc.) of the containment vessel (1).

90. A containment vessel (1) according to any one of the preceding combination(s), wherein the infusion assembly (9) comprises a sealing assembly (89) for providing a corresponding seal between an outer face of the inner infusion component (11) and an inner face of the outer infusion component (13).

91. A containment vessel (1) according to any one of the preceding combination(s), wherein the containment vessel (1) comprises at least one sealing joint (91) between a pair of neighboring components of the containment vessel (1) requiring leak-proofing thereinbetween.

92. A containment vessel (1) according to any one of the preceding combination(s), wherein the containment vessel (1) comprises a safety component (93) being positioned, shaped and sized for preventing the outer infusion component (13) from being removed when the infusion assembly (9) is operated in the inactive mode.

93. A containment vessel (1) according to any one of the preceding combination(s), wherein the main containment body (3) of the containment vessel (1) comprises a double wall, said double wall being vacuum sealed.

94. A containment vessel (1) according to any one of the preceding combination(s), wherein the containment vessel (1) is a containment vessel (1) selected from the group consisting of a mug, a cup, a pot, and a kettle.

95. A kit with corresponding components for assembling a containment vessel (1) and corresponding infusion assembly (9) according to any one of the preceding combination(s).

96. An infusion assembly (9) with use with a containment vessel (1) according to any one of the preceding combination(s).

97. An infusion assembly (9) according to any one of the preceding combination(s), wherein the infusion assembly (9) is a replacement infusion assembly (9) for replacing a previous infusion assembly (9) of the containment vessel (1).

98. A kit with corresponding components for assembling an infusion assembly (9) of a containment vessel (1) according to any one of the preceding combination(s).

As may now better be appreciated, the present invention is a substantial improvement over the known prior art in that, by virtue of its design and components, as explained herein, and the particular configuration of the infusion system and/or components/accessories thereof, present system enables to infuse substances, such as tea and the like, in a more efficient, more precise, more accurate, more reliable, more adjustable, more versatile, more adaptable, more controlled, more timely, and/or more desirable manner (ex. depending on one's specific needs and/or preferences, etc., and/or the intended results, etc.), than what is possible with conventional devices known to the Applicant.

Indeed, the present system is particularly advantageous in that it provides a system for controlling the infusion time, and to stop the infusion of the tea leaves at the desired steep "concentration" (ex. content, flavor, time, etc.).

The present system is also advantageous in that: a) it is preferably made to be BPA free; b) it can be provided with anti-spill capability due to its lock-top; c) it can be completely dissembled for easy cleaning; d) it is preferably meant to be machine washable (ex. for use in a dishwasher, etc.); e) it can be provided with a double-wall and/or vacuum sealed vessel that can keep teas "hot" about 12 hours, and/or "cold" for about 6 hours; f) the present infusion system and/or assembly can be customized to fit into any vessel so that one can offer an exclusive and innovative product to various users, customers, etc. (indeed, one can change up colours, add graphics, and/or even explore unique vessel shapes, etc.); g) etc.

Of course, and as can be easily understood by a person skilled in the art, the scope of the claims should not be limited by the possible embodiments set forth in the examples, but should be given the broadest interpretation consistent with the description as a whole.

Furthermore, although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims and as apparent to a person skilled in the art.

The invention claimed is:

1. A containment vessel (1) with integrated infusion capability for infusing a solid substance with a liquid, the containment vessel (1) comprising:
    a main containment body (3) having a containment volume (3a) for containing the liquid;
    a dispensing assembly (5) being removably mountable onto the main containment body (3), and having at least one fluid port (7) being fluidly connectable to the containment volume (3a) of the main containment body (3), for dispensing fluid through said at least one fluid port (7);
    an infusion assembly (9) operatively mountable between the main containment body (3) and the dispensing assembly (5), the infusion assembly (9) having inner and outer infusion components (11,13) insertable into the containment volume (3a) of the containment body (3) for cooperation with the liquid, a first one of the infusion components (11,13) being operatively mountable onto the main containment body (3), with the inner component (11) being positioned, shaped and sized for containing the solid substance to be steeped into the liquid of the main containment body (3), the infusion components (11,13) being each provided with at least one hole (11a,13a), and a second one of the infusion components (11,13) being moveable with respect to the first one, so as to allow the infusion assembly (9) to be operable between an active mode, where at least one operative hole of the outer infusion component (13) is aligned with at least one corresponding operative hole of the inner infusion component (11) in order to define a fluid passage where infusion of the solid substance takes place with the liquid present in the main containment body (3), and an inactive mode, where the at least one operative hole of the outer infusion component (13) is misaligned with the at least one corresponding operative hole of the inner infusion component (11) in order to selectively close the fluid passage and thus selectively stop an infusion process of the solid substance with the liquid present inside the main containment body (3);
    a transmission assembly (15) operatively connectable to the infusion assembly (9) for mechanically driving the infusion assembly (9) between the active and inactive modes; and
    an actuating assembly (17) operatively connectable to the transmission assembly (15) for displacing one of the inner and outer infusion components (11,13) with respect to the other via the transmission assembly (15), so as to in turn selectively operate the infusion assembly (9) between the active and inactive modes, the actuating assembly (17) being manually operated and having at least one actuating component (17a) being provided about a peripheral surface of the containment vessel (1);
    wherein the actuating component (17a) of the actuating assembly (17) includes an actuating ring (27) disposed about a corresponding outer portion of the base component (19), said actuating ring (27) being provided with a socket (27a) for mechanical receiving a segment of the transmission link (15a), and said actuating ring (27) being mechanically connectable to said at least one of the inner and outer components (11,13) via the transmission assembly (15), for allowing a relative movement between said inner and outer infusion components (11,13), in order to selectively operate the infusion assembly (9) between the active and inactive modes, via a corresponding rotation of the actuating ring (27).

2. A containment vessel (1) according to claim 1, wherein the containment vessel (1) comprises a base component (19) for selectively covering an upper opening (3b) of the main containment body (3), the base component (19) being mechanically connectable onto a corresponding collar portion (3c) of the main containment body (3).

3. A containment vessel (1) according to claim 2, wherein complementary threading (21) is provided about the base component (19) and corresponding collar portion (3c) of the main containment body (3) respectively.

4. A containment vessel (1) according to claim 3, wherein complementary threading (21) is also provided about the outer infusion component (13) for allowing the base component (19) to be mechanically connectable onto a corresponding collar portion (13b) of the outer infusion component (13) as well.

5. A containment vessel (1) according to claim 2, wherein the base component (19) is provided with the at least one actuating component (17a) of the actuating assembly (17), said actuating component (17a) being operatively connectable to at least one of the inner and outer infusion components (11,13) for selectively operating the infusion assembly (9) between the active and inactive modes.

6. A containment vessel (1) according to claim 2, wherein the transmission assembly (15) includes an assembly knob (23) operatively mountable about a top portion of the base component (19), said assembly knob (23) being operatively connectable to said at least one of the inner and outer components (11,13) via a transmission link (15a) of the transmission assembly (15), for allowing a relative rotation between said inner and outer infusion components (11,13), in order to selectively operate the infusion assembly (9) between the active and inactive modes, via a corresponding operation of the actuating assembly (17).

7. A containment vessel (1) according to claim 6, wherein the transmission link (15a) is disposed centrally about the base component (19) and/or infusion assembly (9), and is configured for operatively interconnecting the assembly knob (23) to the inner infusion component (11), so that securing of the assembly knob (23) onto the base component (19) in turn forces a relative movement of the inner infusion component (11) with respect to the outer infusion component (13) when the actuating assembly (17) is operated.

8. A containment vessel (1) according to claim 6, wherein the transmission link (15a) comprises an extremity being operatively being mechanically connectable onto a corresponding upper portion of the inner infusion component (11).

9. A containment vessel (1) according to claim 8, wherein the extremity of the transmission link (15a) is mechanically connectable onto a corresponding recess (25a) of a cap (25) of the inner infusion component (11).

10. A containment vessel (1) according to claim 6, wherein the transmission link (15a) comprises a peripheral groove (15b) being positioned, shaped and sized for operatively engaging a corresponding inner component of the base component (19) so that a corresponding rotation of the actuating assembly (17) in turn vertically displaces the inner infusion component (11) with respect to the outer infusion component (13), thereby enabling the infusion assembly (9) to be selectively operated between the active and inactive modes via the actuating assembly (17).

11. A containment vessel (1) according to claim 1, wherein the socket (27a) is a bore having a cross-sectional profile with n sides, n being an integer equal to or greater than 1.

12. A containment vessel (1) according to claim 1, wherein the socket (27a) has 6 sides, and thus, is an hexagonal bore.

13. A containment vessel (1) according to claim 1, wherein the socket (27a) is connected to a main peripheral body of the actuating ring (27) via at least one radial arm (27b).

14. A containment vessel (1) according to claim 13, wherein the at least one radial arm (27b) is provided with at least one reinforcement portion (27c).

15. A containment vessel (1) according to claim 13, wherein the base component (19) is provided with a protruding stoppage wall (29) for delimiting a specific range of rotation of the at least one radial arm (27b) and corresponding actuating ring (27) about the base component (19).

16. A containment vessel (1) according to claim 15, wherein the protruding stoppage wall (29) is positioned, shaped and sized so that a first end (29a) of the protruding stoppage wall (29) abutting against the at least one radial arm (27b) corresponds to the active mode of the infusion assembly (9), and so that a second end (29b) of the protruding stoppage wall (29) abutting against the at least one radial arm (27b) corresponds to the inactive mode of the infusion assembly (9).

17. A containment vessel (1) according to claim 15, wherein the protruding stoppage wall (29) is an arched wall.

18. A containment vessel (1) according to claim 1, wherein the actuating ring (27) comprises at least one interlocking component (31) for removably interlocking with a corresponding positioning component (33) of the base component (19) for selectively maintaining the infusion assembly (9) in place, in the active and inactive modes, respectively.

19. A containment vessel (1) with integrated infusion capability for infusing a solid substance with a liquid, the containment vessel (1) comprising:
a main containment body (3) having a containment volume (3a) for containing the liquid;
a dispensing assembly (5) being removably mountable onto the main containment body (3), and having at least one fluid port (7) being fluidly connectable to the containment volume (3a) of the main containment body (3), for dispensing fluid through said at least one fluid port (7);
an infusion assembly (9) operatively mountable between the main containment body (3) and the dispensing assembly (5), the infusion assembly (9) having inner and outer infusion components (11,13) insertable into the containment volume (3a) of the containment body (3) for cooperation with the liquid, a first one of the infusion components (11,13) being operatively mountable onto the main containment body (3), with the inner component (11) being positioned, shaped and sized for containing the solid substance to be steeped into the liquid of the main containment body (3), the infusion components (11,13) being each provided with at least one hole (11a,13a), and a second one of the infusion components (11,13) being moveable with respect to the first one, so as to allow the infusion assembly (9) to be operable between an active mode, where at least one operative hole of the outer infusion component (13) is aligned with at least one corresponding operative hole of the inner infusion component (11) in order to define a fluid passage where infusion of the solid substance takes place with the liquid present in the main containment body (3), and an inactive mode, where the at least one operative hole of the outer infusion component (13) is misaligned with the at least one corresponding operative hole of the inner infusion component (11) in order to selectively close the fluid passage and thus selectively stop an infusion process of the solid substance with the liquid present inside the main containment body (3);
a transmission assembly (15) operatively connectable to the infusion assembly (9) for mechanically driving the infusion assembly (9) between the active and inactive modes; and
an actuating assembly (17) operatively connectable to the transmission assembly (15) for displacing one of the inner and outer infusion components (11,13) with respect to the other via the transmission assembly (15), so as to in turn selectively operate the infusion assembly (9) between the active and inactive modes, the actuating assembly (17) being manually operated and having at least one actuating component (17a) being provided about a peripheral surface of the containment vessel (1);
wherein the containment vessel (1) comprises a base component (19) for selectively covering an upper opening (3b) of the main containment body (3), the base component (19) being mechanically connectable onto a corresponding collar portion (3c) of the main containment body (3);
wherein complementary threading (21) is provided about the base component (19) and corresponding collar (3c) portion of the main containment body (3) respectively; and
wherein complementary threading (21) is also provided about the outer infusion component (13) for allowing the base component (19) to be mechanically connectable onto a corresponding collar portion (13b) of the outer infusion component (13) as well.

20. A containment vessel (1) with integrated infusion capability for infusing a solid substance with a liquid, the containment vessel (1) comprising:
   a main containment body (3) having a containment volume (3a) for containing the liquid;
   a dispensing assembly (5) being removably mountable onto the main containment body (3), and having at least one fluid port (7) being fluidly connectable to the containment volume (3a) of the main containment body (3), for dispensing fluid through said at least one fluid port (7);
   an infusion assembly (9) operatively mountable between the main containment body (3) and the dispensing assembly (5), the infusion assembly (9) having inner and outer infusion components (11,13) insertable into the containment volume (3a) of the containment body (3) for cooperation with the liquid, a first one of the infusion components (11,13) being operatively mountable onto the main containment body (3), with the inner component (11) being positioned, shaped and sized for containing the solid substance to be steeped into the liquid of the main containment body (3), the infusion components (11,13) being each provided with at least one hole (11a,13a), and a second one of the infusion components (11,13) being moveable with respect to the first one, so as to allow the infusion assembly (9) to be operable between an active mode, where at least one operative hole of the outer infusion component (13) cooperates with at least one corresponding operative hole of the inner infusion component (11) in order to define a fluid passage where infusion of the solid substance takes place with the liquid present in the main containment body (3), and an inactive mode, where the at least one operative hole of the outer infusion component (13) ceases to cooperate with the at least one corresponding operative hole of the inner infusion component (11) in order to selectively stop an infusion process of the solid substance with the liquid present inside the main containment body (3);
   a transmission assembly (15) operatively connectable to the infusion assembly (9) for mechanically driving the infusion assembly (9) between the active and inactive modes; and
   an actuating assembly (17) operatively connectable to the transmission assembly (15) for displacing one of the inner and outer infusion components (11,13) with respect to the other via the transmission assembly (15), so as to in turn selectively operate the infusion assembly (9) between the active and inactive modes, the actuating assembly (17) being manually operated and having at least one actuating component (17a) being provided about a peripheral surface of the containment vessel (1);
   wherein the actuating component (17a) of the actuating assembly (17) includes an actuating ring (27) disposed about a corresponding outer portion of the base component (19), said actuating ring (27) being provided with a socket (27a) for mechanical receiving a segment of the transmission link (15a), and said actuating ring (27) being mechanically connectable to said at least one of the inner and outer components (11,13) via the transmission assembly (15), for allowing a relative displacement between said inner and outer infusion components (11,13), in order to selectively operate the infusion assembly (9) between the active and inactive modes, via a corresponding rotation of the actuating ring (27).

* * * * *